US012567121B2

(12) United States Patent
Ishigame et al.

(10) Patent No.: US 12,567,121 B2
(45) Date of Patent: Mar. 3, 2026

(54) IMAGE MANAGEMENT METHOD AND DATA STRUCTURE OF METADATA

(71) Applicant: SONY GROUP CORPORATION, Tokyo (JP)

(72) Inventors: Kazuo Ishigame, Tokyo (JP); Itaru Shimizu, Tokyo (JP); Naomi Kurahara, Tokyo (JP); Satoshi Ezawa, Tokyo (JP); Tetsu Ogawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 489 days.

(21) Appl. No.: 17/616,590

(22) PCT Filed: May 29, 2020

(86) PCT No.: PCT/JP2020/021286
§ 371 (c)(1),
(2) Date: Dec. 3, 2021

(87) PCT Pub. No.: WO2020/250708
PCT Pub. Date: Dec. 17, 2020

(65) Prior Publication Data
US 2022/0230266 A1      Jul. 21, 2022

(30) Foreign Application Priority Data

Jun. 12, 2019      (JP) ................................. 2019-109284

(51) Int. Cl.
G06F 21/00          (2013.01)
G06T 1/00           (2006.01)
(52) U.S. Cl.
CPC .......... G06T 1/0021 (2013.01); G06T 1/0007 (2013.01); G06T 2201/0064 (2013.01)

(58) Field of Classification Search
CPC ................. G06T 1/0021; G06T 1/0007; G06T 2201/0064; G06T 2207/10032;
(Continued)

(56) References Cited

U.S. PATENT DOCUMENTS 9,960,837 B1      5/2018  Coleman
2008/0037825 A1*  2/2008  Lofgren .................. G06F 16/58
                                                       382/100
(Continued)

FOREIGN PATENT DOCUMENTS

CA          2734940 A1      3/2010
CN          104782108 A      7/2015
(Continued)

OTHER PUBLICATIONS

Zhang, Yulin, Zhaohui Dang, Li Fan, and Zhaokui Wang. "A rapid method for calculating maximal and minimal inter-satellite distances." Advances in Space Research 59, No. 1 (2017): 401-412 (Year: 2017).*
International Search Report and Written Opinion of PCT Application No. PCT/JP2020/021286, issued on Sep. 1, 2020, 09 pages of ISRWO.
(Continued)

*Primary Examiner* — Yogesh Paliwal
(74) *Attorney, Agent, or Firm* — CHIP LAW GROUP

(57) ABSTRACT
Provided is an image management method and a data structure of metadata that allow for management of an image captured by an artificial satellite. A management device that manages a captured image captured by a satellite adds metadata that includes at least information regarding a person related to the captured image to the captured image.

14 Claims, 17 Drawing Sheets

(58) Field of Classification Search
CPC ....... G06V 20/13; G06F 16/58; G06F 16/587;
H04N 21/8358; H04L 9/3247
See application file for complete search history.

(56) References Cited

U.S. PATENT DOCUMENTS

| | | | | |
|---|---|---|---|---|
| 2010/0174753 | A1* | 7/2010 | Goranson | G06F 16/78 |
| | | | | 707/791 |
| 2011/0206096 | A1 | 8/2011 | Antikidis et al. | |
| 2011/0298923 | A1* | 12/2011 | Mukae | G08G 1/205 |
| | | | | 348/E7.085 |
| 2014/0270332 | A1* | 9/2014 | Pacifici | G06T 7/514 |
| | | | | 382/100 |
| 2015/0302541 | A1 | 10/2015 | Yoshimura et al. | |
| 2019/0028183 | A1* | 1/2019 | Coleman | H04L 69/40 |

FOREIGN PATENT DOCUMENTS

| JP | 2002-092352 | A | 3/2002 |
|---|---|---|---|
| JP | 2004-015451 | A | 1/2004 |
| JP | 2012-501135 | A | 1/2012 |
| JP | 2012-032304 | A | 2/2012 |
| JP | 2012-252614 | A | 12/2012 |
| JP | 2014-103522 | A | 6/2014 |
| WO | WO-02071685 | A1 | 9/2002 |
| WO | 2010/023396 | A1 | 3/2010 |
| WO | 2010/097921 | A1 | 9/2010 |

OTHER PUBLICATIONS

"IPTC Photo Metadata", IPTC Photo Metadata Standard 2017.1,
IPTC Photo Metadata Working Group, Version 2017.1, Revision 3,
Mar. 18, 2019.

* cited by examiner

| | ARTIFICIAL SATELLITE | MANAGEMENT DEVICE | ANALYSIS SERVER |
|---|:---:|:---:|:---:|
| • INFORMATION FOR SPECIFYING SATELLITE | | | |
|   • CLUSTER ID | ○ | ○ | |
|   • INDIVIDUAL ID | ○ | ○ | |
| • INFORMATION REGARDING RELATIVE POSITION | | | |
|   • ANGLE INFORMATION OF ITSELF | ○ | ○ | |
|   • SATELLITE TYPE (OPTICAL SATELLITE, SAR SATELLITE, USAGE, AND SIZE) | ○ | ○ | |
|   • TLE INFORMATION, GPS INFORMATION, AND ORBIT POSITION/ORBIT ALTITUDE INFORMATION | ○ | ○ | |
|   • SPEED INFORMATION | ○ | ○ | |
|   • SENSOR INFORMATION | ○ | ○ | |
| • INFORMATION REGARDING IMAGING CONTENTS | | | |
|   • IMAGING TARGET POSITION INFORMATION | ○ | ○ | |
|   • IMAGING CONDITIONS | ○ | ○ | |
|   • SENSOR TYPE | ○ | ○ | |
|   • IMAGING TIME | ○ | ○ | |
|   • SATELLITE POSITION AT TIME OF IMAGING | | ○ | |
|   • WEATHER INFORMATION (CLOUD COVER/AMOUNT OF SUNLIGHT) | | ○ | |
| • INFORMATION REGARDING IMAGE TYPE | | | |
|   • BAND INFORMATION | ○ | ○ | ○ |
|     • WAVELENGTH INFORMATION | ○ | ○ | ○ |
|     • RGB (TrueColor) / IR / MONOCHROME | ○ | ○ | ○ |
|   • COLORING INFORMATION (INFORMATION THAT SPECIFIC TARGET SUCH AS PLANT HAS BEEN COLORED [False color]) | ○ | | ○ |
|   • ANALYSIS INFORMATION (NDVI IMAGE OR NDWI IMAGE) | | | ○ |
|   • IMAGE PROCESSING INFORMATION | | | ○ |
|     • PROCESSING TIME | | | ○ |
|     • PROCESSING LEVEL (L0, L1 ... L5) | | | ○ |
|       • RADIOMETRIC CORRECTION L1, GEOMETRIC CORRECTION L2, MAP PROJECTION, AND ORTHO-CORRECTION | | | ○ |
|       • PROCESSING METHOD (PAN-SHARPENING PROCESSING, TRUE COLOR COMPOSITION PROCESSING, SAR IMAGE COMPOSITION PROCESSING, ETC) | | | ○ |
| • RELATED PERSON INFORMATION | | | |
|   • OWNER OF SATELLITE | | ○ | ○ |
|   • SERVICE OPERATOR | | ○ | ○ |
|   • PERSON WHO HAS RIGHT TO IMAGE | | ○ | ○ |

*FIG. 14*

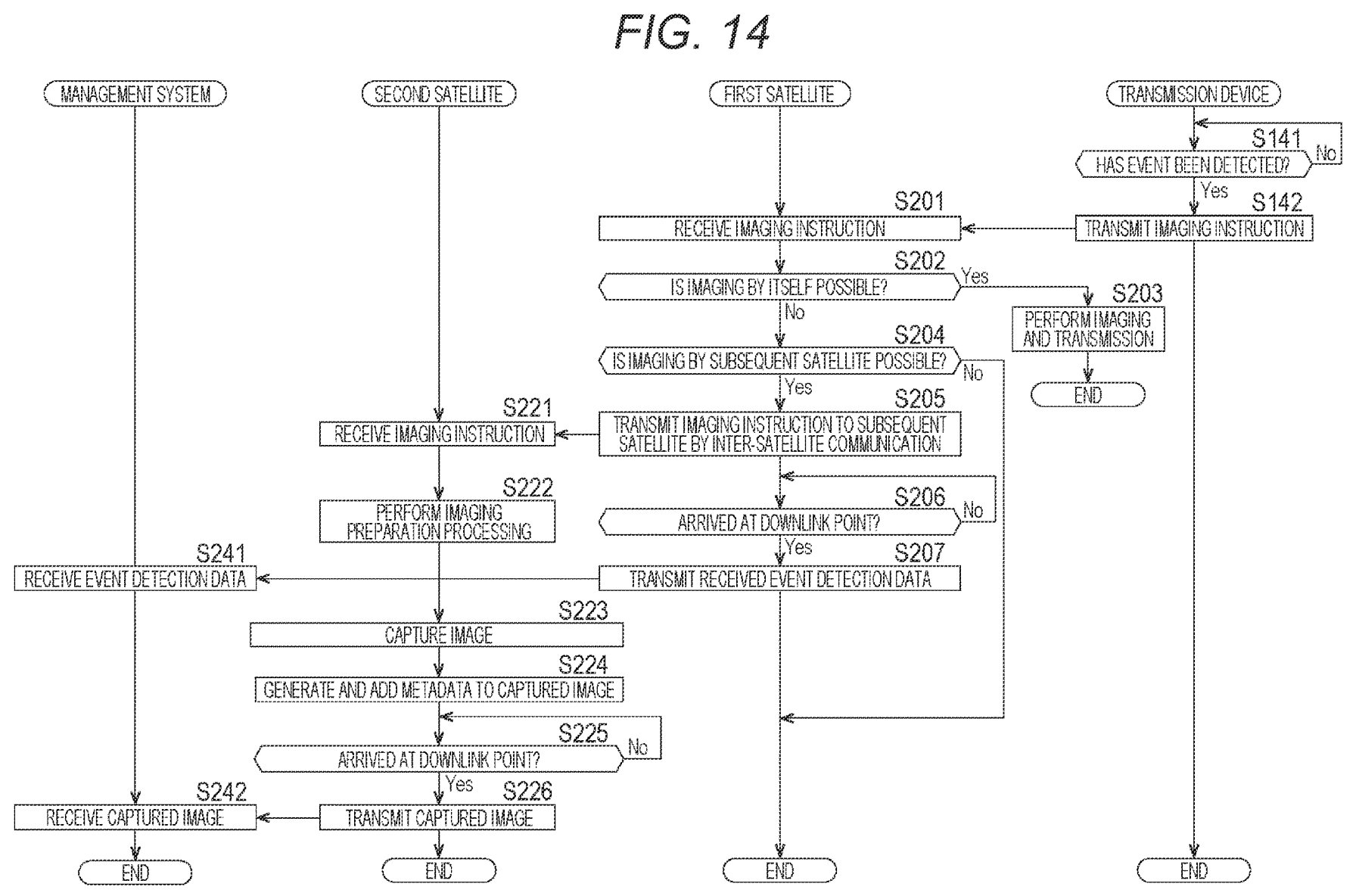

TRANSMISSION DEVICE

S141 HAS EVENT BEEN DETECTED? No
Yes

S142 TRANSMIT IMAGING INSTRUCTION

END

FIRST SATELLITE

S201 RECEIVE IMAGING INSTRUCTION

S202 IS IMAGING BY ITSELF POSSIBLE? No
Yes

S203 PERFORM IMAGING AND TRANSMISSION

END

S204 IS IMAGING BY SUBSEQUENT SATELLITE POSSIBLE? No
Yes

S205 TRANSMIT IMAGING INSTRUCTION TO SUBSEQUENT SATELLITE BY INTER-SATELLITE COMMUNICATION

S206 ARRIVED AT DOWNLINK POINT? No
Yes

S207 TRANSMIT RECEIVED EVENT DETECTION DATA

END

SECOND SATELLITE

S221 RECEIVE IMAGING INSTRUCTION

S222 PERFORM IMAGING PREPARATION PROCESSING

S223 CAPTURE IMAGE

S224 GENERATE AND ADD METADATA TO CAPTURED IMAGE

S225 ARRIVED AT DOWNLINK POINT? No
Yes

S226 TRANSMIT CAPTURED IMAGE

END

MANAGEMENT SYSTEM

S241 RECEIVE EVENT DETECTION DATA

S242 RECEIVE CAPTURED IMAGE

END

IMAGE MANAGEMENT METHOD AND DATA STRUCTURE OF METADATA

CROSS REFERENCE TO RELATED APPLICATIONS

This application is a U.S. National Phase of International Patent Application No. PCT/JP2020/021286 filed on May 29, 2020, which claims priority benefit of Japanese Patent Application No. JP 2019-109284 filed in the Japan Patent Office on Jun. 12, 2019. Each of the above-referenced applications is hereby incorporated herein by reference in its entirety.

TECHNICAL FIELD

The present technology relates to an image management method and a data structure of metadata, and more particularly, to an image management method and a data structure of metadata that allow for management of an image captured by an artificial satellite.

BACKGROUND ART

There is a technology called satellite remote sensing for observing a situation of a target area or a target object or detecting a change in situation from an image of a predetermined area on the earth captured by an artificial satellite (see, for example, Patent Documents 1 and 2).

CITATION LIST

Patent Document

Patent Document 1: WO 2010/097921 A
Patent Document 2: Japanese Patent Application Laid-Open No. 2004-15451

SUMMARY OF THE INVENTION

Problems to be Solved by the Invention

In recent years, research and development of low-cost small satellites by private sectors have progressed. It is expected that images will be captured by many artificial satellites in the future, and a system for management of an image captured by an artificial satellite is desired.

The present technology has been made in view of such a situation, and allows for management of an image captured by an artificial satellite.

Solutions to Problems

An image management method according to a first aspect of the present technology includes adding, by a management device that manages a captured image captured by a satellite, metadata that includes at least information regarding a person related to the captured image, to the captured image.

In the first aspect of the present technology, the metadata that includes at least the information regarding the person related to the captured image captured by the satellite is added to the captured image.

A data structure of metadata according to a second aspect of the present technology is a data structure of metadata of a captured image captured by a satellite, in which the metadata includes at least information regarding a person related to the captured image, and a management device that manages the captured image is used for processing of collating the person related to the captured image.

In the second aspect of the present technology, the metadata that includes at least the information regarding the person related to the captured image captured by the satellite is used for the processing of collating the person related to the captured image.

BRIEF DESCRIPTION OF DRAWINGS

FIG. 4 is a block diagram illustrating a configuration example of a satellite.

FIG. 10 is a diagram illustrating information attached as metadata.

FIG. 14 is a flowchart illustrating a second event imaging sequence by the satellite image processing system of the second embodiment.

MODE FOR CARRYING OUT THE INVENTION

Figure 1:
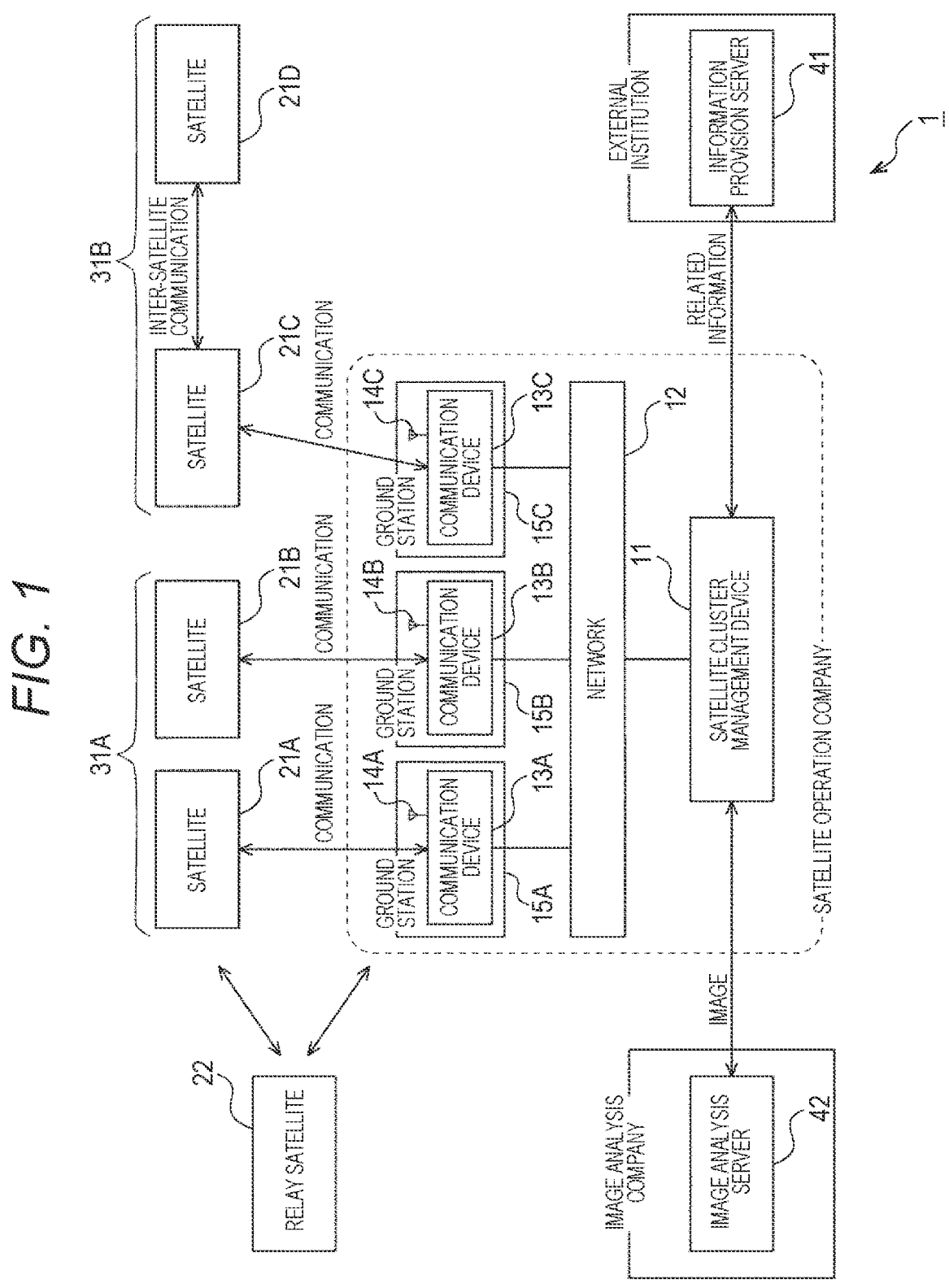
FIG. 1 is a block diagram illustrating a configuration example of a first embodiment of a satellite image processing system to which the present technology is applied.

Modes for carrying out the present technology (hereinafter referred to as "embodiments") will be described below. Note that the description will be made in the order below.
1. Configuration example of satellite image processing system
2. Imaging sequence by single device
3. Imaging preparation processing
4. Flowchart of formation flight
5. Example of image processing
6. Details of metadata
7. Details of distribution management processing
8. Application example of formation flight 9. Second embodiment of satellite image processing system 10. First event imaging sequence of second embodiment 11. Second event imaging sequence of second embodiment 12. Third event imaging sequence of second embodiment 13. Another configuration example of transmission device 14. Application examples of satellite image processing system using event detection sensor 15. Configuration example of computer

1. Configuration Example of Satellite Image Processing System

FIG. 1 is a block diagram illustrating a configuration example of a first embodiment of a satellite image processing system to which the present technology is applied.

A satellite image processing system 1 in FIG. 1 is a system that uses captured images captured by a plurality of artificial satellites (hereinafter simply referred to as satellites) to perform satellite remote sensing in which a situation of a target area or a target object on the earth is observed or a change in situation is detected. In the present embodiment, a satellite is mounted with an imaging device, and has at least a function of imaging the ground.

A satellite operation company has a satellite cluster management device 11 that manages a plurality of satellites 21 and a plurality of communication devices 13 that communicate with the satellites 21. Note that the satellite cluster management device 11 and some of the plurality of communication devices 13 may be devices owned by a company other than the satellite operation company. The satellite cluster management device 11 and the plurality of communication devices 13 are connected via a predetermined network 12. The communication devices 13 are disposed at ground stations (base stations on the ground) 15. Note that FIG. 1 illustrates an example in which the number of the communication devices 13 is three, which are communication devices 13A to 13C, but the number of the communication devices 13 is optional.

The satellite cluster management device 11 manages the plurality of satellites 21 owned by the satellite operation company. Specifically, the satellite cluster management device 11 acquires related information from one or more information provision servers 41 of an external institution as necessary, and determines an operation plan for the plurality of satellites 21 owned by the satellite cluster management device 11 itself. Then, the satellite cluster management device 11 instructs a predetermined satellite 21 to capture an image via a communication device 13 in response to a request from a customer, thereby causing the predetermined satellite 21 to capture an image. Furthermore, the satellite cluster management device 11 acquires and stores the captured image transmitted from the satellite 21 via the communication device 13. The acquired captured image is subjected to predetermined image processing as necessary, and provided (transmitted) to the customer. Alternatively, the acquired captured image is provided (transmitted) to an image analysis server 42 of an image analysis company, subjected to predetermined image processing, and then provided to the customer.

The information provision server 41 installed in the external institution supplies predetermined related information to the satellite cluster management device 11 via a predetermined network in response to a request from the satellite cluster management device 11 or on a periodic basis. The related information provided from the information provision server 41 includes, for example, the following. For example, orbit information of a satellite described in a Two Line Elements (TLE) format can be acquired as related information from North American Aerospace Defense Command (NORAD) as an external institution. Furthermore, for example, it is possible to acquire weather information such as weather and cloud cover at a predetermined point on the earth from a weather information providing company as an external institution.

The image analysis server 42 performs predetermined image processing on the image captured by the satellite 21 supplied from the satellite cluster management device 11 via a predetermined network. The processed image is provided to a customer of the image analysis company, or supplied to the satellite cluster management device 11 of the satellite operation company. For example, the image analysis server 42 performs metadata generation processing for adding predetermined metadata to an image captured by the satellite 21, correction processing such as distortion correction of the captured image, image composition processing such as color composition processing, and the like. The image processing of the captured image may be performed by a satellite operation company, and in this case, the satellite operation company and the image analysis company are the same. Furthermore, the satellite cluster management device 11 and the image analysis server 42 may be constituted by one device.

In accordance with the control of the satellite cluster management device 11, the communication device 13 communicates with a predetermined satellite 21 designated by the satellite cluster management device 11 via an antenna 14. For example, the communication device 13 transmits, to a predetermined satellite 21, an imaging instruction for imaging a predetermined region on the ground at a predetermined time and position. Furthermore, the communication device 13 receives the captured image transmitted from the satellite 21, and supplies the captured image to the satellite cluster management device 11 via the network 12. Transmission from the communication device 13 of the ground station 15 to the satellite 21 is also referred to as uplink, and transmission from the satellite 21 to the communication device 13 is also referred to as downlink. The communication device 13 can perform communication directly with the satellite 21, and can also perform communication via a relay satellite 22. As the relay satellite 22, for example, a geostationary satellite is used.

The network 12 or a network between the information provision server 41 or the image analysis server 42 and the satellite cluster management device 11 is an optional communication network, and may be a wired communication network, may be a wireless communication network, or may be constituted by both of them. Furthermore, the network 12 and the network between the information provision server 41 or the image analysis server 42 and the satellite cluster management device 11 may be constituted by one communication network, or may be constituted by a plurality of communication networks. These networks can be a communication network or a communication path compliant with an optional communication standard, for example, the Internet, a public telephone line network, a wide area communication network for a wireless moving object such as a so-called 4G line or 5G line, a wide area network (WAN), a local area network (LAN), a wireless communication network for communication that meets a Bluetooth (registered trademark) standard, a communication path for short-range wireless communication such as near field communication (NFC), a communication path for infrared communication, or a communication network for wired communication that meets a standard such as high-definition multimedia interface (HDMI (registered trademark)) or universal serial bus (USB).

A plurality of the satellites 21 constitutes a satellite cluster 31. In FIG. 1, a satellite 21A and a satellite 21B constitute a first satellite cluster 31A, and a satellite 21C and a satellite 21D constitute a second satellite cluster 31B. Note that the example in FIG. 1 illustrates, for the sake of simplicity, an example in which one satellite cluster 31 is constituted by two satellites 21, but the number of satellites 21 constituting one satellite cluster 31 is not limited to two.

In a case where the communication device 13 communicates with the satellites 21 constituting the satellite cluster 31, there are a method in which communication is performed individually with the satellites 21 as in the first satellite cluster 31A in FIG. 1, and a method in which only one satellite 21C (hereinafter also referred to as the representative satellite 21C) representing the satellite cluster 31 communicates with the communication device 13 and the other satellite 21D indirectly communicates with the communication device 13 by inter-satellite communication with the representative satellite 21C as in the second satellite cluster 31B. By which method communication with the ground station 15 (the communication device 13 thereof) is to be performed may be determined in advance by the satellite cluster 31, or may be appropriately selected in accordance with contents of communication.

In the satellite image processing system 1 configured as described above, the plurality of satellites 21 constituting one satellite cluster 31 may be operated by an operation method called formation flight.

Figure 2:
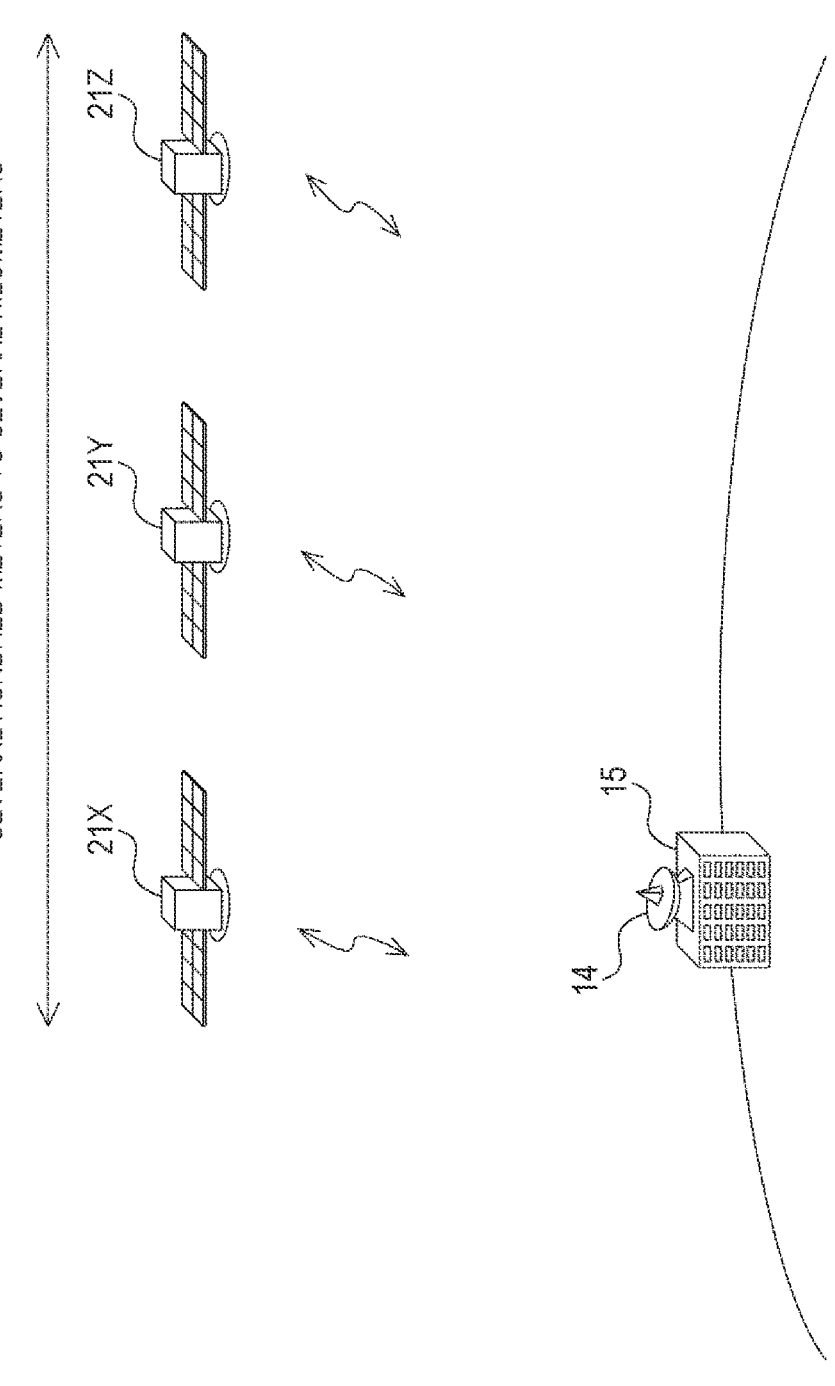
FIG. 2 is a diagram illustrating a formation flight.

The formation flight is an operation method in which, as illustrated in FIG. 2, a plurality of satellites 21 constituting one satellite cluster 31 flies while maintaining a relative positional relationship in a narrow range of about several hundred meters to several kilometers, and the plurality of satellites 21 operates in a coordinated manner, so that a service that cannot be provided by a single satellite can be provided. In FIG. 2, three satellites 21X to 21Z constitute one satellite cluster 31, and each of the satellites 21X to 21Z communicates with the ground station 15. In the uplink, a cluster ID (satellite cluster ID), which is an identifier for identifying the satellite cluster 31, and an individual ID (satellite ID), which is an identifier for identifying each satellite 21 constituting the satellite cluster 31, are designated, so that a command or data is transmitted to a desired satellite 21.

The formation flight allows functions to be assigned to a plurality of satellites 21 instead of a single satellite, and therefore has an advantage that the satellites 21 can be downsized. For example, as for imaging functions, even in a case where a performance (e.g., the resolution) of the imaging device mounted on each satellite 21 is lowered, high resolution can be achieved by image composition or the like of captured images captured by the plurality of satellites 21.

Figure 3:
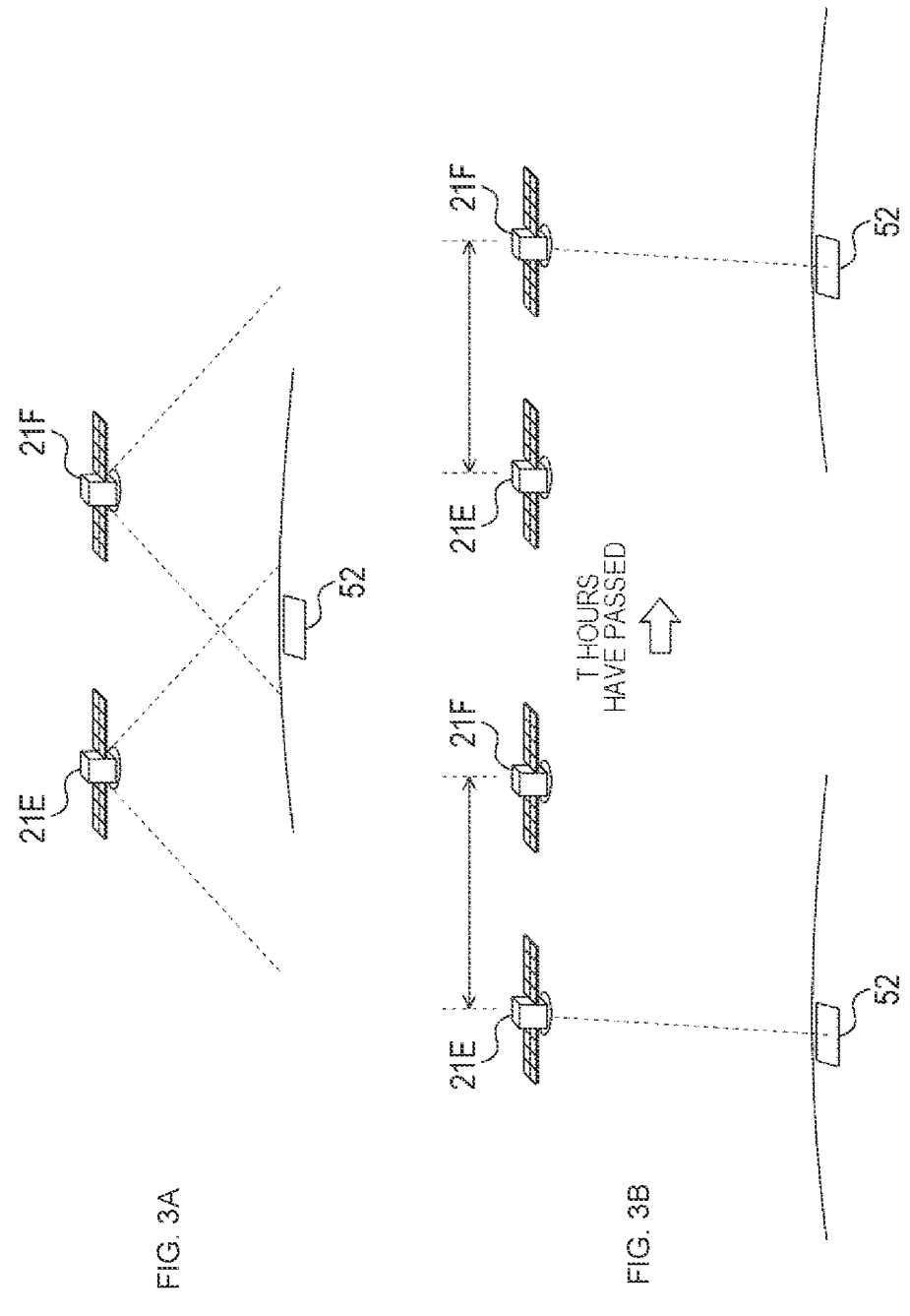
FIGS. 3A and 3B are diagrams illustrating a formation flight.

For example, as illustrated in FIG. 3A, two satellites 21E and 21F can simultaneously image one region 52 (simultaneous imaging) from different imaging points (satellite positions). A result of imaging the same ground surface from different imaging points can be used for generation of a digital elevation model (DEM) indicating a height necessary for three-dimensional measurement. Furthermore, a parallax image is obtained from the captured images from the two satellites 21E and 21F, and three-dimensional measurement can be performed.

Furthermore, as illustrated in FIG. 3B, a plurality of satellites 21E and 21F can image one region 52 with a time difference (differential imaging) at the same imaging point and imaging angle. For example, in a case where the satellites 21 are moving at a speed of 7 km per second and flying in formation with a distance of 100 m between the satellites 21, imaging can be performed every 1.4×10-2 seconds. As described above, a formation flight allows for imaging at a short time interval, and thus, for example, it is possible to extract a change (displacement) in an object on the earth such as a passenger car on a road or a buoy on the sea, and to measure the speed of a moving object.

There is a constellation as a system for operating a plurality of satellites 21, but the constellation is "a system that mainly deploys a uniform global service by putting a large number of satellites into a single or a plurality of orbital planes", which is a concept different from that of the formation flight.

Figure 4:
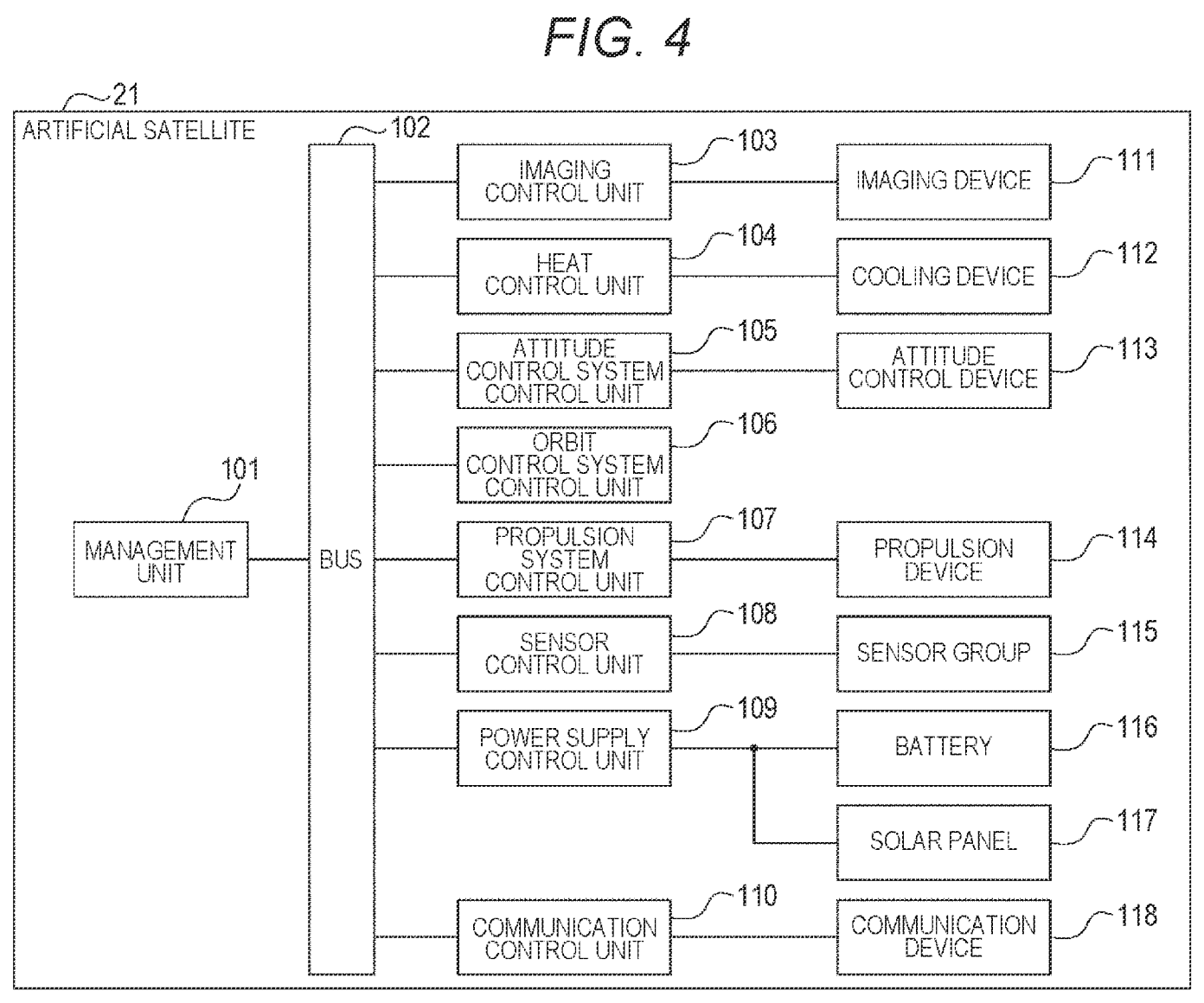

FIG. 4 is a block diagram illustrating a configuration example of a satellite 21.

The satellite 21 includes a management unit 101, a bus 102, an imaging control unit 103, a heat control unit 104, an attitude control system control unit 105, an orbit control system control unit 106, a propulsion system control unit 107, a sensor control unit 108, a power supply control unit 109, and a communication control unit 110. Furthermore, the satellite 21 also includes an imaging device 111, a cooling device 112, an attitude control device 113, a propulsion device 114, a sensor group 115, a battery 116, a solar panel 117, and a communication device 118. The management unit 101 and control units for devices are connected via the bus 102, the control units including the imaging control unit 103, the heat control unit 104, the attitude control system control unit 105, the orbit control system control unit 106, the propulsion system control unit 107, the sensor control unit 108, the power supply control unit 109, and the communication control unit 110.

The management unit 101 acquires states of the devices from the corresponding control units for the devices via the bus 102, and outputs an operation command to the control units for the devices, thereby controlling an operation of the entire satellite 21.

The imaging control unit 103 controls an operation of the imaging device 111 in accordance with the operation command from the management unit 101. The imaging device 111 is constituted by, for example, a camera module including an image sensor, and images a target object. In a case where the satellite 21 is a synthetic aperture radar (SAR) satellite, the imaging device 111 is constituted by a radar device.

The heat control unit 104 acquires a sensor value of a temperature sensor included in the sensor group 115, monitors a temperature change in the satellite 21, and performs control to cause the entire satellite 21 to be within a prescribed temperature range. Basically, the temperature change is controlled by a structure or a characteristic of a material, but dynamic cooling using the cooling device 112 may be performed as necessary. The cooling device 112 performs cooling by using a cryogen such as liquid helium, for example.

The attitude control system control unit 105 controls the attitude control device 113 in accordance with an operation command from the management unit 101 to perform control to turn the satellite 21 in an intended direction. For example, the attitude control system control unit 105 performs control to turn the antenna 14 toward the ground station 15, turn the solar panel 117 toward the sun, or turn an observation sensor of the imaging device 111 or the like in the direction of an observation target. The attitude control device 113 is constituted by, for example, a wheel such as a three-axis gyroscope or a control moment gyroscope, a magnetic torquer, and the like. The attitude control system control unit 105 may use not only the attitude control device 113 but also the propulsion device 114 for attitude control. When performing attitude control, the attitude control system control unit 105 acquires sensor values of various sensors of the sensor group 115 as necessary. Examples of the sensors used for the attitude control include a sun sensor, an earth sensor, a star sensor, a magnetic sensor, and a gyroscope.

The orbit control system control unit 106 performs control related to maintaining an orbit altitude and changing the orbit. The orbit control system control unit 106 performs control in cooperation with the propulsion system control unit 107 and the propulsion device 114.

The propulsion system control unit 107 controls the propulsion device 114 in accordance with an operation command from the management unit 101. The propulsion device 114 is constituted by, for example, a solid motor, an ion engine, or an apogee engine. The propulsion system control unit 107 acquires sensor values of the various sensors of the sensor group 115 and operates the propulsion device 114 in cooperation with the attitude control device 113 as necessary, thereby performing attitude control and attitude control for the satellite 21. In a case where the satellite 21 is a small satellite, a chemical propulsion thruster or the like may not be mounted for the purpose of attitude control.

The sensor control unit 108 controls the various sensors included in the sensor group 115, and supplies sensor values to the management unit 101 or to another control unit. The various sensors are sensors for monitoring the state in the satellite 21, and include, for example, a GPS receiver, a star tracker (attitude sensor), an acceleration sensor, a gyroscope sensor, a magnetic sensor, a temperature sensor, a sun sensor, an earth sensor, and a star sensor.

The power supply control unit 109 controls the battery 116 and the solar panel 117. Power generated by the solar panel 117 is stored in the battery 116 under the control of the power supply control unit 109. The power in the battery 116 may be directly distributed to the devices in the satellite 21, or may be distributed via the bus 102.

The communication control unit 110 controls the communication device 118 in accordance with an operation command from the management unit 101. The communication device 118 has an antenna, and communicates with the communication device 13 of the ground station 15 in accordance with the control of the communication control unit 110. Furthermore, the communication device 118 can also communicate with another satellite 21 constituting the same satellite cluster 31 and with the relay satellite 22. Furthermore, the communication control unit 110 and the communication device 118 may have separate systems, one for transmission and reception of commands and telemetry, which are small in data amount, and one for mission-related data (imaging data and the like), which is large in data amount.

The control units from the imaging control unit 103 to the communication control unit 110 may be further divided into two or more, any two or more of the control units may be integrated, or the control units may be integrated with the management unit 101. Computational resource such as a central processing unit (CPU) and a memory are basically mounted on the management unit 101, but may also be mounted on the control units. The control units may be implemented in a common hardware module.

The imaging devices 111 of a plurality of the satellites 21 constituting one satellite cluster 31 may have the same performance, or may have different performances.

For example, in a case where imaging devices 111 of the same model number are adopted as the imaging devices 111 mounted on the satellites 21 so that the satellites 21 have the same performance, there are the following advantages. For example, images of the same performance can be acquired with a short time difference, and the difference can be easily detected. Furthermore, it is possible to generate a highly accurate (high-resolution) image by, for example, compositing images captured in accordance with an assignment. Furthermore, this allows for a redundancy, which makes a malfunction in one device tolerable.

On the other hand, in a case where the imaging devices 111 mounted on the satellites 21 have different performances, it is possible to assign different roles in imaging, for example, one for high-sensitivity monochrome imaging and one for low-sensitivity color imaging. Note that the different performances includes not only a case where the mounted hardware configurations are different but also a case where the mounted hardware configurations are the same but the performances are different due to a difference in control. For example, an example is assumed in which, in a case where the image sensors are of the same model number, one satellite 21 acquires a high-sensitivity low-resolution image with a faster shutter speed, and another satellite 21 acquires a low-sensitivity high-resolution image in an opposite way.

As an assignment example in a case where the imaging devices 111 of the plurality of satellites 21 have different performances, there may be, for example, control to make any one of sensitivity/shutter speed, resolution, monochrome/color/polarization, or band (wavelength region), or a combination thereof, different. Furthermore, the plurality of satellites 21 may be different in battery performance or communication performance.

Figure 5:
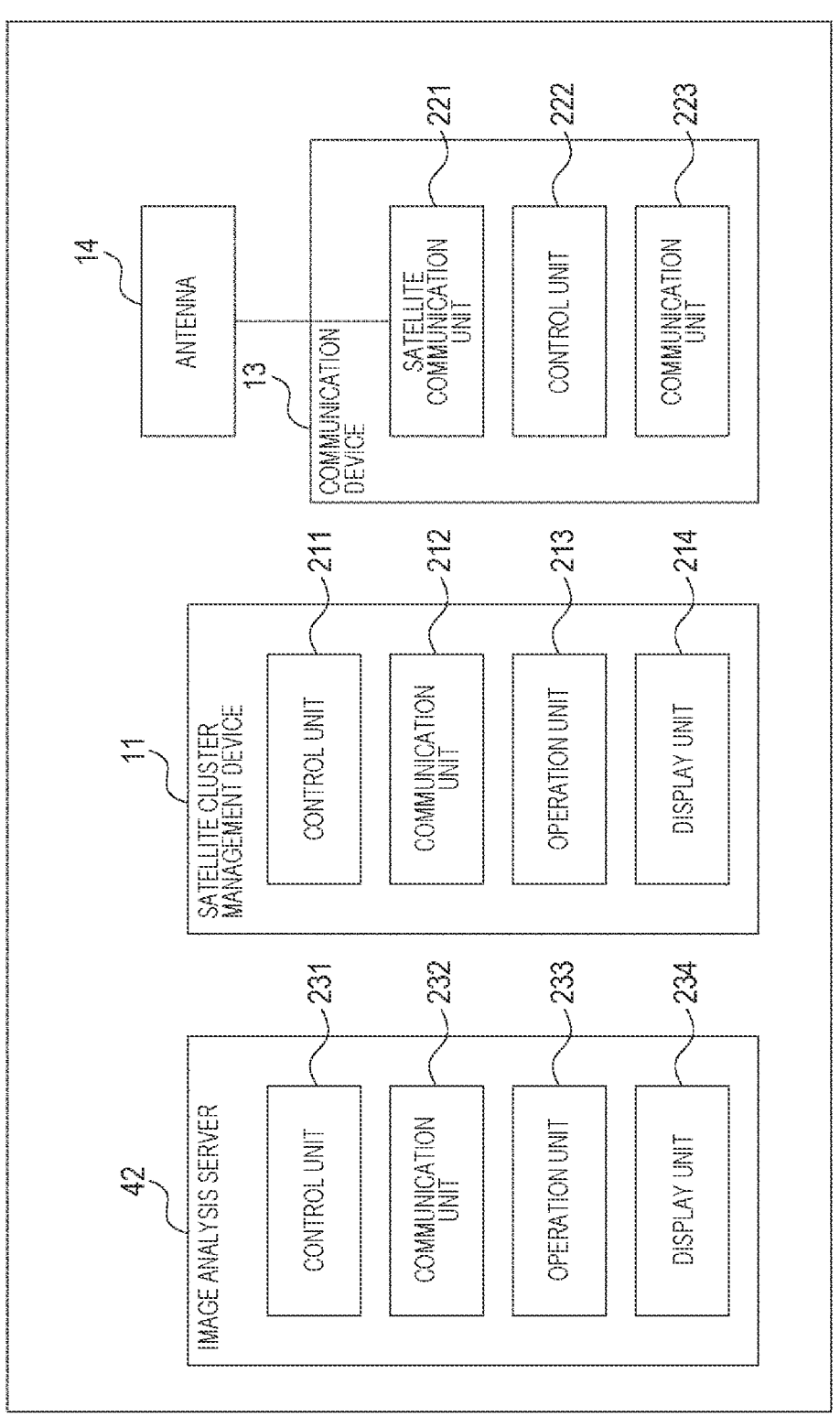
FIG. 5 is a block diagram illustrating a configuration example of a satellite cluster management device, a communication device, and an image analysis server.

FIG. 5 is a block diagram illustrating a configuration example of the satellite cluster management device 11, the communication device 13, and the image analysis server 42.

The satellite cluster management device 11 includes a control unit 211, a communication unit 212, an operation unit 213, and a display unit 214.

The control unit 211 manages the plurality of satellites 21 owned by the satellite operation company by executing a satellite management application program stored in a storage unit (not illustrated). For example, the control unit 211 determines an operation plan for the plurality of satellites 21 by using related information acquired from the information provision server 41 as necessary, and instructs the satellites 21 to control the attitude or capture an image via the communication device 13. Furthermore, the control unit 211 performs, for example, processing of generating metadata of a captured image transmitted from a satellite 21 via the communication device 13 and adding the metadata to the captured image.

In accordance with an instruction from the control unit 211, the communication unit 212 performs a predetermined communication with the communication device 13 via the network 12, and also performs a predetermined communication with the image analysis server 42.

The operation unit 213 is constituted by, for example, a keyboard, a mouse, and a touch panel, receives an input of a command or data based on a user (operator) operation, and supplies the command or data to the control unit 211.

The display unit 214 is constituted by, for example, a liquid crystal display (LCD) or an organic electro luminescence (EL) display, and displays a screen of the satellite management application program, or displays a captured image captured by the satellite 21, a processed image obtained by performing predetermined image processing on the captured image, or the like.

The communication device 13 includes a satellite communication unit 221, a control unit 222, and a communication unit 223.

The satellite communication unit 221 communicates with the satellites 21 of a target satellite cluster 31 via the antenna 14 on the basis of the control of the control unit 222.

The control unit 222 causes the satellite communication unit 221 to communicate with a satellite 21 in accordance with the control from the satellite cluster management device 11. Furthermore, the control unit 222 transmits data such as a captured image acquired from the satellite 21 to the satellite cluster management device 11 via the communication unit 223.

The communication unit 223 performs a predetermined communication with the satellite cluster management device 11 on the basis of the control of the control unit 222.

The image analysis server 42 includes a control unit 231, a communication unit 232, an operation unit 233, and a display unit 234.

By executing an image analysis application program stored in a storage unit (not illustrated), the control unit 231 performs, on a captured image supplied from the satellite cluster management device 11, predetermined image processing such as metadata generation processing for adding predetermined metadata to the captured image, correction processing for distortion correction or the like of the captured image, or image composition processing such as color composition processing.

The communication unit 232 performs a predetermined communication with the satellite cluster management device 11 or another device in accordance with the control from the control unit 231. For example, the communication unit 232 receives a captured image captured by the satellite 21 from the satellite cluster management device 11 and supplies the captured image to the control unit 231, or transmits a processed image after image processing to the satellite cluster management device 11.

The operation unit 233 is constituted by, for example, a keyboard, a mouse, and a touch panel, receives an input of a command or data based on a user (operator) operation, and supplies the command or data to the control unit 231.

The display unit 214 is constituted by, for example, an LCD or an organic EL display, and displays a screen of the image analysis application program or displays an image before or after image processing.

The satellites 21 and other devices constituting the satellite image processing system 1 are configured as described above.

Note that the satellite cluster management device 11 selects an optimal communication device 13 from among the plurality of communication devices 13 in accordance with the orbit of a satellite 21 with which communication is to be performed, and causes the selected communication device 13 to transmit a predetermined command such as an imaging instruction or receive data such as a captured image via the communication device 13. Since the satellite cluster management device 11 performs a predetermined communication integrally with the communication device 13 optionally selected in accordance with the target satellite 21, the satellite cluster management device 11 and the communication device 13 will be collectively referred to as a management system in the following description.

2. Imaging Sequence by Single Device

Next, an imaging sequence focusing on one predetermined satellite 21 of the satellite cluster 31 that performs a formation flight will be described with reference to a flowchart in FIG. 6.

First, in step S11, a management system determines requirements for imaging by the satellite 21 on the basis of a request from a customer.

Specifically, the management system determines, as the imaging requirements, an imaging date and time, an imaging point, an environmental condition for imaging, a camera setting value, and the like. The environmental condition for imaging includes, for example, a weather condition such as cloud cover at the imaging date and time, and the camera setting value includes, for example, the resolution (resolving power), zoom, shutter speed, sensitivity, and aperture.

In step S12, the management system determines the satellite 21 and the ground station 15 (the communication device 13 thereof) that meet the imaging requirements.

Specifically, the management system selects the satellite 21 that meets the determined imaging requirements. For example, the satellite 21 is determined on the basis of determinations on whether the satellite 21 passes over an imaging target position at the determined imaging date and time, whether the imaging target position is within the range of observation width of the satellite 21, whether the imaging device 111 mounted on the satellite 21 satisfies requirements such as the resolving power and the determined camera setting value, and the like. Then, the ground station 15 suitable for communicating with the selected satellite 21 is determined.

Furthermore, the management system can select the satellite 21 in consideration of an expected remaining battery level of the satellite 21 at the imaging date and time, a power consumption for imaging, and the like. For example, in a case where the selected satellite 21 is planned to perform another imaging immediately before the imaging date and time, power is consumed by the imaging, attitude control, data communication, heat control, and the like associated with the imaging, and it is assumed that the next imaging may not be able to be performed. Thus, a degree of priority of the satellite 21 is set in accordance with the expected remaining battery level and the power consumption for the imaging, and the satellite 21 is selected.

In step S13, the management system directs the antenna 14 of the selected ground station 15 toward an assumed orbit. The satellite cluster management device 11 transmits orbit information of the selected satellite 21 to the communication device 13, and the communication device 13 directs the antenna 14 toward the assumed orbit.

In step S14, the management system transmits (uplinks) an imaging instruction to the selected satellite 21. That is, the satellite cluster management device 11 transmits a command for transmitting an imaging instruction to the communication device 13 of the selected ground station 15, and the communication device 13 that has received the command transmits the imaging instruction to the selected satellite 21 via the antenna 14. The imaging instruction includes an imaging date and time, an imaging point, a camera setting value, and the like.

In step S31, the satellite 21 receives the imaging instruction from the ground station 15, and in step S32, transmits a reception completion to the ground station 15.

In step S15, the management system receives the reception completion from the satellite 21, and stops transmitting the imaging instruction. The transmission of the imaging instruction from the ground station 15 is repeated until the satellite 21 returns the reception completion.

In step S33, the satellite 21 performs imaging preparation processing based on the received imaging instruction. For example, the satellite 21 controls the attitude of the satellite 21 or an orientation of the imaging device 111 (pointing) such that the imaging device 111 turns toward the imaging target position as necessary. Furthermore, for example, the imaging control unit 103 sets zoom, shutter speed, sensitivity, aperture, and the like of the image sensor. Moreover, the power supply control unit 109 performs charging in advance so that sufficient power is obtained at the imaging date and time.

At the imaging date and time designated by the imaging instruction, the satellite 21 images the imaging target position in step S34.

In step S35, the satellite 21 generates metadata, which is information to be associated with a captured image obtained as a result of the imaging, and adds the metadata to the captured image. Although details of the metadata will be described later, for example, information such as a cluster ID for identifying the satellite cluster 31, an individual ID for identifying each satellite 21, an imaging target position (subject position), and an imaging time can be generated as the metadata.

In step S36, the satellite 21 transmits (downlinks) the captured image to which the metadata has been added to the ground station 15. The downlink may be performed immediately after generation of the captured image and the metadata, or may be performed at the time of arrival within a predetermined range in a predetermined ground station 15. Furthermore, the captured image may be transmitted via the relay satellite 22.

In step S16, the management system receives the captured image from the satellite 21. Specifically, the communication device 13 receives the captured image via the antenna 14, and supplies the captured image to the satellite cluster management device 11.

In step S17, the satellite cluster management device 11 analyzes the metadata of the captured image. At this time, the satellite cluster management device 11 may newly generate metadata on the basis of a result of the analysis, and add this metadata. For example, the satellite cluster management device 11 calculates a satellite position at the time of imaging on the basis of the cluster ID and the individual ID of the captured image and the orbit information of the satellite 21, and adds the satellite position as metadata.

In step S18, the satellite cluster management device 11 performs predetermined image processing on the captured image captured by the satellite 21. The satellite cluster management device 11 performs, for example, correction processing such as distortion correction and image composition processing such as color composition processing. Details of the image processing will be described later.

In step S19, the satellite cluster management device 11 executes distribution management processing on the captured image and the processed image, and stores the captured image and the processed image in a predetermined storage unit. Details of the distribution management processing will also be described later.

Thus, a series of sequences for imaging by one satellite 21 ends. Note that the image processing by the image analysis server 42 can be appropriately performed as necessary, and can be performed in a shared manner with the image processing by the satellite cluster management device 11 or performed instead of being performed by the satellite cluster management device 11. In a similar manner, the distribution management processing may be performed by the image analysis server 42.

Note that, in the above-described example, the metadata is added to the captured image and transmitted, but the metadata may be transmitted as a stream different from the captured image. At this time, only the metadata may be transmitted prior to the captured image.

3. Imaging Preparation Processing

Incidentally, resources are limited particularly in a small satellite 21, and thus, it is necessary to pay particular attention to the remaining battery level, and it is important to control imaging in accordance with this.

Figure 6:
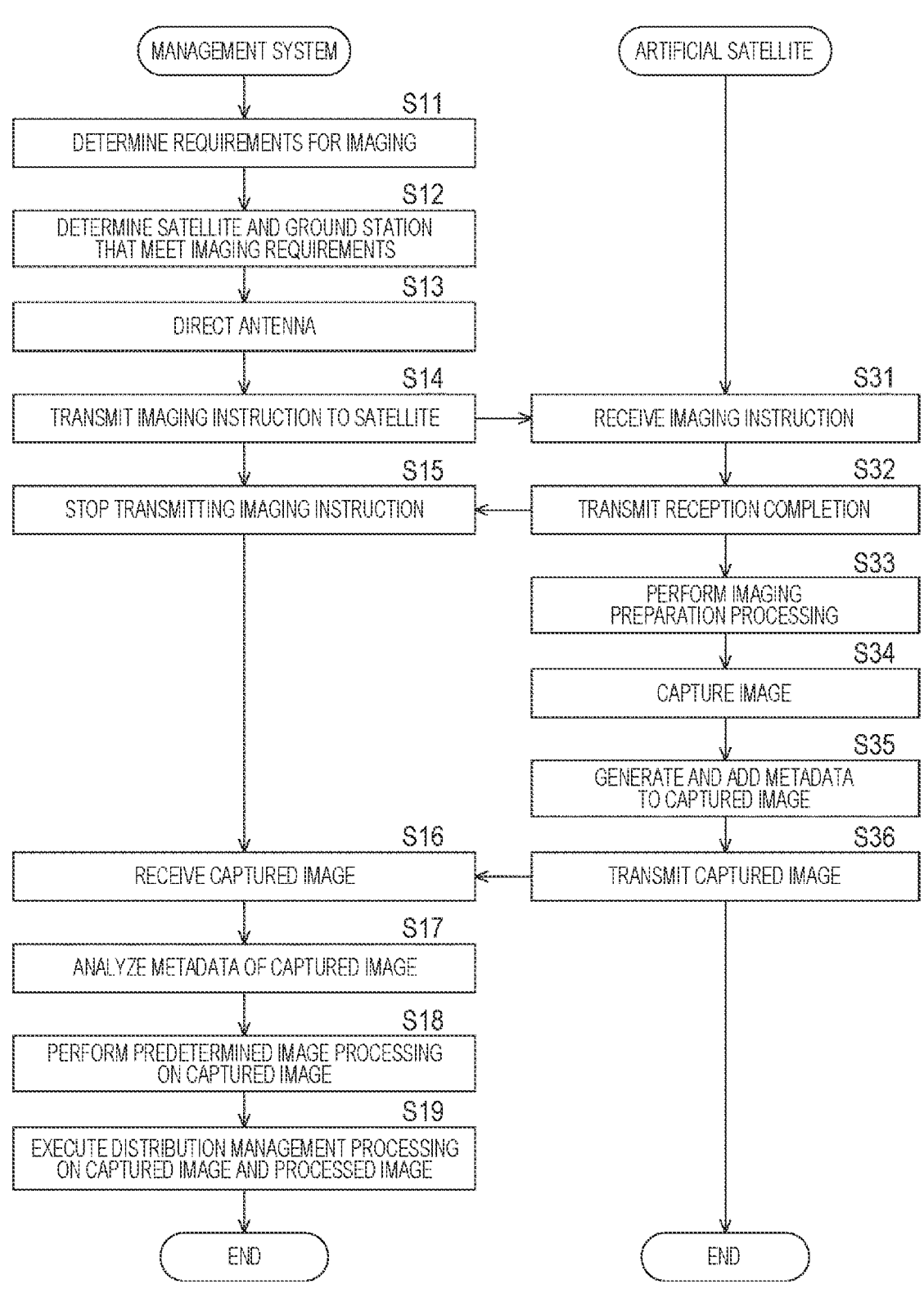
FIG. 6 is a flowchart illustrating an imaging sequence focusing on one satellite.
Figure 7:
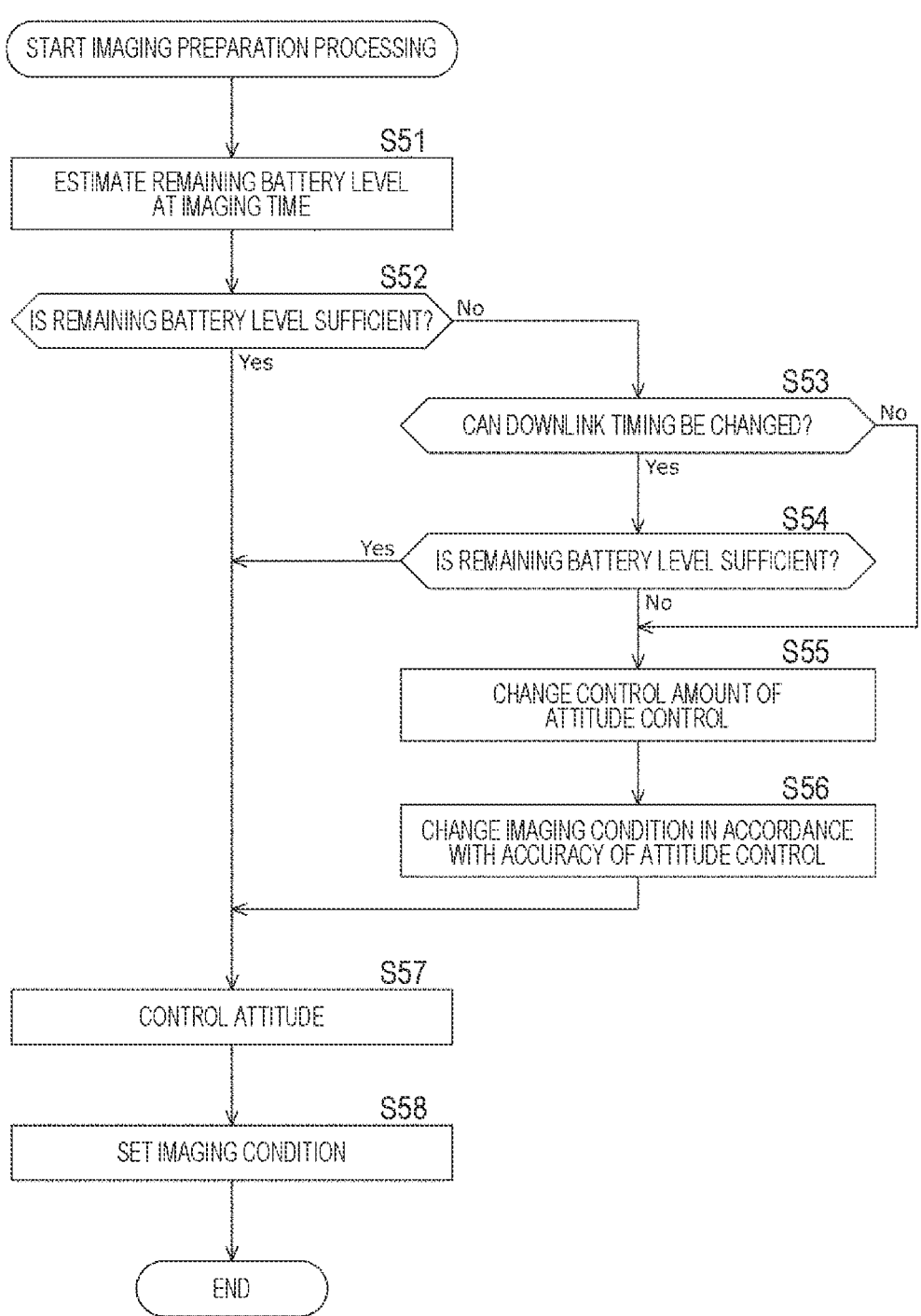
FIG. 7 is a detailed flowchart of imaging preparation processing in step S33 in FIG. 6.

FIG. 7 is a detailed flowchart of the imaging preparation processing in step S33 in FIG. 6. Here, it is assumed that the imaging instruction received in step S31 before step S33 is an instruction to capture an image at imaging time t1.

In the imaging preparation processing, first, in step S51, the management unit 101 of the satellite 21 estimates the remaining battery level at the imaging time t1. Specifically, the management unit 101 estimates the remaining battery level at the imaging time t1 from (an estimated value of) a charge capacity accumulated by solar power generation by the imaging time t1 with respect to the current remaining battery level.

In step S52, the management unit 101 determines whether the remaining battery level is sufficient on the basis of the estimated remaining battery level.

Specifically, the management unit 101 determines whether the estimated remaining battery level is sufficient from factors of power consumption related to imaging and factors of power consumption that are not for imaging. The factors of power consumption related to imaging include imaging processing by the imaging device 111, attitude control (pointing) for the satellite 21, and heat control associated therewith. The imaging processing by the imaging device 111 takes into consideration how many images are to be captured with what degree of accuracy (resolving power, shutter speed, necessity of zoom, and the like) at the imaging time t1. The attitude control for the satellite 21 includes a change in the attitude of the satellite itself and a change in the attitude of the antenna. Furthermore, in a case where the camera module itself as the imaging device 111 can change the attitude in the direction of imaging, a change in the attitude of the camera module is also included in the attitude control for the satellite 21. The factors of power consumption that are not for imaging include communication (uplink and downlink) performed by the imaging time t1.

Figures 8A, 8B:
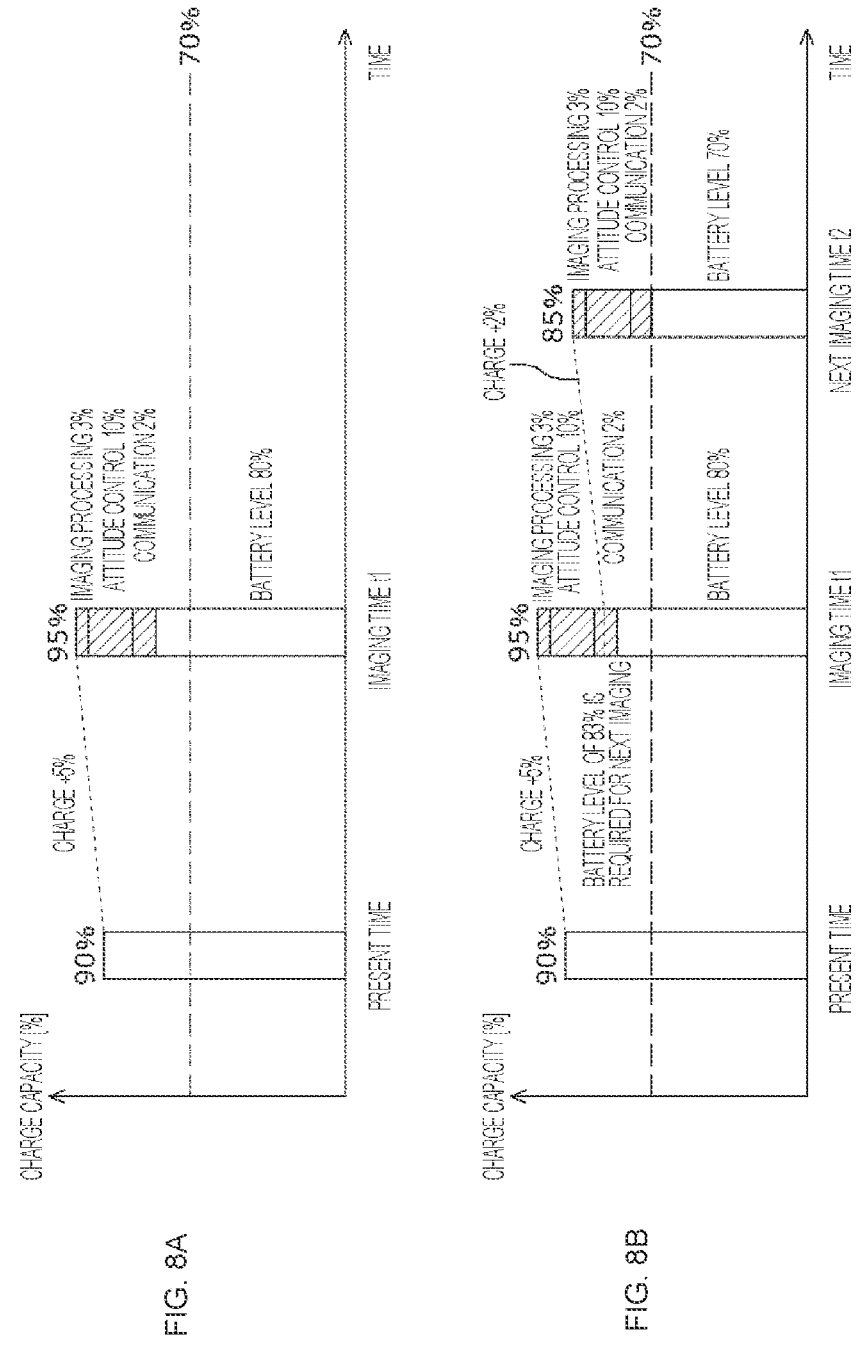
FIGS. 8A and 8B are diagrams illustrating determination of a remaining battery level.

For example, as illustrated in FIG. 8A, on the premise that a charge capacity of 70% of a full charge capacity of the battery 116 is to be maintained at all times, assuming that the current remaining battery level is 90%, the charge capacity by the time t1 is 5%, the power consumption by the imaging processing at the time t1 is 3%, the power consumption by the attitude control is 10%, and the power consumption by the communication performed until the imaging time t1 is 2%, 90% +5%-3%-10%-2% =80% is obtained. The charge capacity of 70% is ensured even after the imaging at the time t1, and the satellite 21 is determined to have a sufficient remaining battery level.

Note that the management unit 101 may determine whether the remaining battery level is sufficient on the basis of the remaining battery level to be kept after the imaging time t1 also in consideration of imaging performed at a timing subsequent to the imaging time t1.

For example, as illustrated in FIG. 8B, assuming that imaging is scheduled at time t2 subsequent to the imaging time t1, the charge capacity from the time t1 to the time t2 is 2%, the power consumption by the imaging processing at the time t2 is 3%, the power consumption by the attitude control is 10%, and the power consumption by the communication performed until the imaging time t2 is 2%, the remaining battery level of 83% is required after the imaging at the time t1. Thus, it is determined that the estimated remaining battery level 80% at the imaging time t1 is not a sufficient remaining battery level.

Note that the above-described example mainly describes power consumption related to imaging, but power consumption for others such as power consumption by heat control associated with attitude control, periodic communication, and the like is also taken into consideration.

As described above, whether or not the remaining battery level is sufficient is determined. If it is determined in step S52 in FIG. 7 that the remaining battery level is not sufficient, the processing proceeds to step S53, and the satellite 21 determines whether an assumed downlink timing before the imaging time t1 can be changed. By changing the downlink timing, it is possible to save the amount of power required for the downlink.

If it is determined in step S53 that the downlink timing cannot be changed, the processing in step S53 is skipped, and the processing proceeds to step S55.

On the other hand, if it is determined in step S53 that the downlink timing can be changed, the processing proceeds to step S54. The management unit 101 changes the downlink timing, and determines whether the remaining battery level is sufficient after the change. If it is determined also in step S54 that the remaining battery level is not sufficient, the processing proceeds to step S55. On the other hand, if it is determined in step S54 that the remaining battery level is sufficient, the processing proceeds to step S57.

In step S55, the management unit 101 changes an accuracy of the attitude control. In the attitude control, for example, two types, that is, a wheel and an ion engine, are used to repeat applying a moment toward a target attitude and then applying a reverse moment when the attitude has passed through the target attitude. When a swing speed has become equal to or less than a certain value, it is determined that the attitude has been changed to the target attitude. To change the accuracy of the attitude control, the management unit 101 changes, for example, the range of the swing speed used to determine that the target attitude has been obtained. An electricity consumption can be saved by changing the range of the swing speed to increase and reducing the control amount of the attitude control.

In step S56, the management unit 101 changes an imaging condition in accordance with the accuracy of the attitude control. When the range of the swing speed increases, the attitude of the satellite 21 is not stabilized and wobble occurs, which may cause subject blurring. Furthermore, the pointing is insufficient, and it is conceivable that sufficient zoom cannot be achieved. Thus, the management unit 101 changes an imaging condition to compensate for the adverse effects caused by the reduction in the control amount of the attitude control.

For example, the management unit 101 changes an imaging condition as follows.

The management unit 101 increases the shutter speed of the image sensor to cope with subject blurring. Furthermore, moreover, since the captured image becomes dark when the shutter speed is increased, the management unit 101 may perform control to increase the sensitivity (gain).

Furthermore, for example, the management unit 101 can reduce the resolving power (resolution) of the captured image for the purpose of improving the sensitivity per unit pixel. With this arrangement, the shutter speed can be improved, an influence of the decrease in the accuracy of the attitude control is reduced, and the amount of data at the time of downlink can be reduced. Furthermore, the management unit 101 selects a setting value for not using optical zoom. With this arrangement, a tolerance for image blurring (wobble) can be increased.

Furthermore, in a case where the camera module has a mechanical blur correction mechanism (spatial blurring correction), the mechanical blur correction mechanism may be performed instead of reducing the accuracy of the attitude control.

Furthermore, instead of reducing the resolving power (resolution) of the captured image, the management unit 101 may configure an imaging setting for continuously capturing a plurality of images. A high-resolution captured image composited and generated from the continuously captured images is generated and transmitted (downlinked) to the ground station 15, so that a decrease in resolving power (resolution) of the captured image can be compensated. Note that generation of the high-resolution image by image composition may be performed by the satellite cluster management device 11 or the image analysis server 42 after downlink. The satellite cluster management device 11 or the image analysis server 42 can also perform composition by using a past captured image such as a base image or a captured image captured by another satellite 21.

After step S56, or if it is determined in step S52 or step S54 that the remaining battery level is sufficient, the processing proceeds to step S57.

In step S57, the management unit 101 controls the attitude of the satellite 21 or the imaging device 111 (performs pointing) in accordance with the setting of the attitude control determined in the processing in step S55.

In step S58, the management unit 101 sets the imaging condition determined in the processing in step S56.

Thus, the imaging preparation processing in step S33 in FIG. 6 ends. At the imaging date and time designated by the imaging instruction, the processing in step S34 in FIG. 6, that is, imaging of the imaging target position is performed.

According to the imaging preparation processing, in a case where the remaining battery level is low, the accuracy of stabilization in the attitude control that greatly affects the electricity consumption is lowered, and an imaging condition or the image processing in the subsequent stage is changed. This makes it possible to secure a quality of the captured image while suppressing a battery consumption.

4. Flowchart of Formation Flight

Next, a formation flight executed by the plurality of satellites 21 constituting one satellite cluster 31 will be described.

Figure 9:
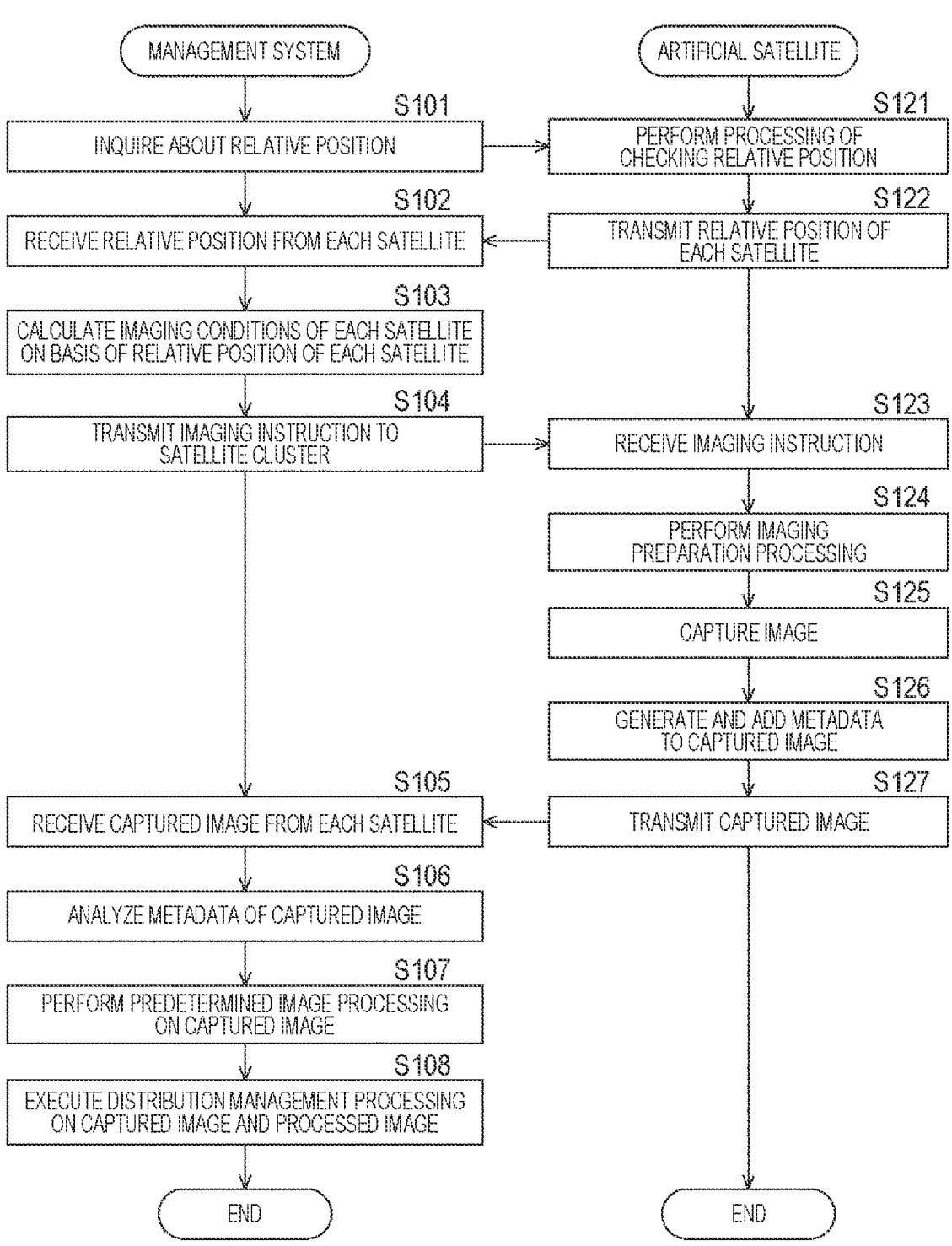
FIG. 9 is a flowchart of the satellite image processing system in which a formation flight is performed.

FIG. 9 is a flowchart of the satellite image processing system 1 in which one satellite cluster 31 performs a formation flight.

First, relative position checking processing in steps S101, S121, S122, and S102 is performed between the management system and the satellites 21 of the satellite cluster 31 that performs a formation flight. That is, in step S101, the management system inquires, about the relative position, of the satellites 21 of the satellite cluster 31 performing the formation flight. In step S121, the satellites 21 constituting the satellite cluster 31 perform processing of checking the relative position in response to the inquiry from the management system. Then, in step S122, the satellites 21 transmit the relative position. In step S102, the management system receives the relative position from each satellite 21. Here, the relative position indicates an arrangement sequence of the satellites 21 constituting the satellite cluster 31 and distances between the satellites. The arrangement sequence of the satellites 21 is, for example, an order in which the top (No. 1) is in the traveling direction of the satellites 21. The relative position checking processing may be performed every time an image is captured, or may be performed on a periodic basis, for example, once a day or once a week.

The management system has orbit information of the satellite cluster 31 acquired from NORAD as an external institution, but it may not be possible to determine orbit information of each satellite 21 constituting the satellite cluster 31. Alternatively, even in a case where individual orbit information can be determined by observation from the ground, it may not be possible to determine the order of airframes. In the formation flight, there is a case where the satellites 21 are disposed in a range in which the orbit information cannot be individually allocated, and it is not possible to determine the position a certain satellite is placed from the top in the satellite cluster 31. It is therefore necessary to measure the relative positional relationship.

Methods for controlling a relative position are roughly classified into two types: an open-loop method and a closed-loop method.

The open-loop method is a method in which there is no communication between satellites constituting the satellite cluster 31 and the relative position is controlled by an instruction from the ground side. An error is likely to occur in the distances between the satellites.

On the other hand, the closed-loop method is a method of controlling the relative position by performing communication between satellites constituting the satellite cluster 31. The closed-loop method has higher accuracy in relative position than the open-loop method. The closed-loop method includes a centralized type and a decentralized type. In the centralized type, there are a mode in which a satellite 21 serves as a leader and other satellites 21 follow the leader satellite, and a mode in which the leader satellite gives an instruction to the other satellites 21. The decentralized type is a mode in which each of the satellites 21 constituting the satellite cluster 31 autonomously communicates with other surrounding satellites 21 and controls its own position.

In the processing of checking the relative position in step S121, in a case of the open-loop method, for example, there is a method in which the satellites 21 simultaneously image a predetermined point on the ground, and the satellite cluster management device 11 on the ground side checks the arrangement sequence of the satellites 21 on the basis of the captured images and information regarding the attitude (pointing angle) of each satellite 21. Furthermore, for example, there is a method in which the satellites 21 perform communication simultaneously with a predetermined point on the ground, and the communication device 13 on the ground side checks the arrangement sequence from the radio waves at that time. The communication for checking the arrangement sequence may be a downlink of a predetermined captured image, a signal for calibration, or the like. On the other hand, in a case of the closed-loop method, the satellites 21 execute processing of measuring the relative position, and the measurement result is downlinked. The satellites 21 measure the relative position by a method such as a method of measuring the position (direction) by communication between satellites, or a method of radiating laser from the satellites 21 and measuring the distances on the basis of its reflected light.

In the closed-loop method and the open-loop method, only the arrangement sequence of the satellites 21 may be detected, and the distances between the satellites may be calculated by observation from the ground.

In step S103, the management system calculates imaging conditions of each satellite 21 on the basis of the relative position of each satellite 21. The imaging conditions here include, in addition to a setting value of the image sensor, attitude control for the satellite 21 at the time of imaging, imaging timing, and the like. For example, in a case where three-dimensional measurement of the ground is performed, an imaging condition for causing the satellites 21 to be in attitudes in which the imaging target positions are the same is calculated with an inter-satellite distance as a baseline length. In a case where images are captured with a time difference (differential imaging) by the plurality of satellites 21 constituting the satellite cluster 31, the timings (imaging positions) at which a preceding satellite 21 and a subsequent satellite 21 capture images and the attitude at the time of imaging are calculated. The timings at which the satellites 21 capture images are calculated on the basis of the inter-satellite distance.

In step S104, the management system transmits an imaging instruction to each satellite 21 on the basis of the calculated imaging conditions. The imaging instruction is transmitted to all the satellites 21 of the satellite cluster 31 (multicast), and each satellite 21 can select an instruction addressed to itself by the individual ID as destination information included in the imaging instruction.

In step S123, the satellites 21 receive an imaging instruction from the ground station 15, perform imaging preparation processing in step S124, and capture images in step S125. Moreover, the satellites 21 generate and add metadata to the captured images in step S126, and transmit (downlink) the captured images to which the metadata has been added to the ground station 15 in step S127.

The processing in steps S123 to S127 is basically similar to the processing in steps S31 to S36 performed by each satellite 21 described with reference to FIG. 6. Note that, when the captured images are transmitted in step S127, each satellite 21 may individually transmit an image captured by the satellite 21, or the captured images may be collected in the leader satellite by inter-satellite communication and then collectively transmitted by the leader satellite.

In step S105, the management system receives the captured image from each satellite 21, and analyzes the metadata of the captured image in step S106. Moreover, in step S107, the management system performs predetermined image processing on the captured image. In step S108, the management system executes distribution management processing on the captured image and the processed image, and stores the captured image and the processed image in a predetermined storage unit.

The processing in steps S105 to S108 is basically similar to the processing in steps S16 to S19 performed by the management system described with reference to FIG. 6. However, in the image processing in step S107, not only image processing on a captured image obtained by one satellite 21 but also image processing using a plurality of captured images captured in cooperation by the plurality of satellites 21 of the satellite cluster 31 can be performed.

5. Example of Image Processing

A processing example of image processing executed by the satellite cluster management device 11 or the image analysis server 42 in step S18 in FIG. 6 or step S107 in FIG. 9 will be described.

The satellite cluster management device 11 or the image analysis server 42 can perform the following image processing on one captured image captured by each satellite 21.

(1) Generation of Metadata

Metadata can be generated on the basis of information transmitted from the satellite 21 or information regarding the satellite 21 that has captured the image. For example, information regarding latitude and longitude of an imaging target position, and information regarding attitude control and acceleration at the time of imaging by the satellite 21 can be generated as metadata.

(2) Correction Processing of Captured Image

It is possible to perform correction processing such as radiometric correction related to a sensitivity characteristic, geometric correction of an orbit position, an attitude error, or the like of the satellite 21, ortho-correction for correcting geometric distortion caused by a height difference of terrain, and map projection for projecting an image on a map projection surface.

(3) Color Composition Processing

It is possible to perform color composition processing such as pan-sharpening processing, true color composition processing, false color composition processing, natural color composition processing, SAR image composition processing, and processing of adding color to a captured image for each band.

(4) Other Image Compositions

It is also possible to perform composition using a captured image captured by the satellite 21 itself in the past, a captured image captured by another satellite 21, or a base image of some kind, composition using captured images captured in different bands, composition using map information, and the like.

(5) Extraction of Information

It is possible to calculate vegetation detection information such as a normalized difference vegetation index (NDVI) and water detection information such as a normalized difference water index (NDWI) by different bands such as red (R) and infrared (IR). It is possible to perform highlight processing of a specific subject such as a vehicle, a moving object, or a group of fish, extraction of information regarding a specific band or a change from the previous imaging, and the like.

In particular, in a case of using a plurality of captured images captured by the plurality of satellites 21 that performs a formation flight, the satellite cluster management device 11 or the image analysis server 42 can more effectively perform the following image processing.

(1) Higher Resolution or High Quality Processing

By superimposing a plurality of captured images, it is possible to generate a captured image with improved resolving power. Furthermore, it is possible to generate a pan-sharpened image obtained by compositing a monochrome image and a color image, or a captured image in which the resolution has been increased obtained by compositing captured images with different imaging conditions such as different dynamic ranges or shutter speeds, different bands (wavelength bands), or different resolutions, for example.

(2) Function Assignment

An index such as a normalized difference vegetation index (NDVI) can be calculated by different bands such as red (R) and infrared (IR).

(3) Three-Dimensional Measurement

Three-dimensional information can be obtained from a parallax image. Furthermore, the accuracy of recognizing an object on the ground can be enhanced by the three-dimensional information. For example, it is possible to determine whether or not the object is a vehicle (even in a case where it is not possible to immediately recognize the object as a vehicle from the image in terms of resolving power, if it is determined that the object on the road is not a pattern but a three-dimensional object, it is possible to estimate that the object is a vehicle).

(4) Differential Measurement

By using a plurality of captured images captured from the same position with a time difference, it is possible to extract a change between a first time and a second time. Furthermore, imaging may be performed such that only a target that has changed is extracted and colored. Furthermore, for example, a moving speed of a ship or a vehicle can be calculated from a plurality of captured images, or a wind speed can be calculated from a movement of cloud or the like.

(5) Other Image Compositions

It is also possible to perform composition using a past captured image or a captured image captured by another satellite 21, composition using captured images captured in different bands, composition using map information, and the like.

The satellite cluster management device 11 and the image analysis server 42 as image processing apparatuses perform the above-described image processing on the basis of satellite specification information for specifying a satellite associated as metadata with a captured image captured by the satellite 21. In other words, since the satellite specification information is associated as metadata with the captured image, it is possible to process a plurality of images by using a relative positional relationship among the plurality of satellites 21 in a formation flight. The satellite specification information includes at least a cluster ID for identifying the satellite cluster 31, an individual ID for identifying each satellite 21 constituting the satellite cluster 31, and information regarding the relative position of each satellite 21 that performs the formation flight.

Note that, although image processing using a plurality of captured images captured by a formation flight has been described, the above-described image processing may be performed on a plurality of captured images captured by a constellation instead of a formation flight. For example, image processing such as (1) higher resolution or high quality processing, (3) three-dimensional measurement, or (5) other image compositions may be performed on a plurality of captured images captured by a constellation.

(Image Format)

Processed images after image processing and captured images are stored in a storage unit and provided to a customer or the like by using, for example, the following image formats.

(1) CEOS

CEOS is a format standardized by the Committee on Earth Observation Satellites. CEOS includes "CEOS-BSQ" in which a file is divided for each band and "CEOS-BIL" in which a plurality of bands is multiplexed.

(2) HDF

This is a format developed by the National Center for Supercomputing Applications (NCSA) at the University of Illinois. A plurality of bands is grouped into one file so that data can be easily exchanged in a wide variety of computer environments.

(3) Geo TIFF

This is a format in which information for remote sensing is added to a tagged image file format (TIFF). This is in the TIFF format, and can be opened with a general image viewer or the like.

(4) JPEG2000

This is an image format standardized by Joint Photographic Experts Group. JPEG 2000 not only simply increases a compression rate, but also adopts a technology for improving an image in a region of interest and a copyright protection technology such as an electronic watermark.

Methods for presenting processed images and captured images include (1) a method of providing an image in a manner such that the image can be viewed and (2) a method of presenting only information based on analysis of the image.

Moreover, examples of (1) the method of providing an image in a manner such that the image can be viewed include (1A) a method of providing (transmitting) the image itself, (1B) a method of allowing access to a platform such as a data server and allowing a user to view an image of data on the platform, and (1C) a method of providing dedicated software for viewing images to a user and allowing the user to view the images only with the dedicated software.

(2) The method of presenting only information based on analysis of the image is, for example, a method of presenting the number of vehicles or moving objects in each time zone or presenting an area of a group of fish obtained by the processing of information extraction described above.

6. Details of Metadata

FIG. 10 illustrates an example of information attached as metadata to a captured image or a processed image.

The information attached as metadata includes, depending on the type of information, information that can be added by a satellite 21, information that can be added by the satellite cluster management device 11, and information that can be added by the image analysis server 42 of the analysis company. In FIG. 10, the types of information are disposed in a table format, and a circle (○) is attached to a device that can add the corresponding type of information. Note that, in a case where the satellite cluster management device 11 also has an image processing function, it goes without saying that information that can be added by the image analysis server 42 can also be added by the satellite cluster management device 11 itself.

As the metadata, for example, information for specifying a satellite (satellite specification information) can be added. The information for specifying a satellite may include, for example, a cluster ID for identifying the satellite cluster 31, an individual ID for identifying each satellite 21, information regarding the relative position of each satellite 21 constituting the satellite cluster 31 that performs a formation flight, angle information of itself (the satellite 21) at the time of imaging, and a satellite type. The information regarding the relative position includes, for example, information such as the order of the plurality of satellites 21 constituting the satellite cluster 31 and the distances between the satellites. The information regarding the relative position may be information that can be used for estimation of the relative position. The angle information of itself at the time of imaging indicates, for example, the angle of itself with respect to the ground surface at the time of imaging. The satellite type includes, for example, whether the satellite is an optical satellite or a SAR satellite, or a division by classification based on usage and size of the satellite.

Furthermore, the information for specifying a satellite may include, for example, orbit information (TLE information) in the TLE format of the satellite 21, position information (GPS information) by a GPS signal, orbit position/orbit altitude information calculated from at least one of the TLE information or the GPS information, speed information of the satellite 21, and sensor information of an earth sensor, a sun sensor, a star tracker, or the like of the satellite 21.

Furthermore, information regarding imaging contents can be added to the metadata. The information regarding imaging contents may include, for example, imaging target position information indicating a place on the earth as an imaging target, imaging conditions such as the resolution (resolving power), zoom, shutter speed, sensitivity, and aperture (f-number), a sensor type such as the model number of an image sensor, the imaging time, the satellite position at the time of imaging, and weather information such as the cloud cover and amount of sunlight.

As the imaging target position information, for example, information regarding latitude and longitude of a place on the earth as an imaging target is given. The satellite position at the time of imaging is added on the ground side on the basis of orbit information of the satellite 21. The satellite position at the time of imaging may be the orbit information of the satellite 21 itself. Furthermore, in the imaging preparation processing described above, since there is a case where the accuracy of the attitude control is changed in accordance with the remaining battery level, the satellite position at the time of imaging may further include information regarding the accuracy of the attitude control for the satellite 21 at the time of imaging, three-dimensional acceleration information indicating a movement of the satellite itself at the time of imaging, and the like. The information regarding the attitude control can be used as a reference for processing in, for example, high resolution processing on a captured image performed on the ground side.

Moreover, information regarding an image type can be added to the metadata. The information regarding the image type may include band information and image processing information.

The band information includes wavelength information related to a wavelength band, color information indicating RGB (true color), IR (infrared light), or monochrome, coloring information indicating that a specific target such as a plant has been colored (false color), and analysis information indicating that the image indicates a normalized difference vegetation index (NDVI) or a normalized difference water index (NDWI).

The image processing information includes a processing time, a processing level, a processing method, and the like of the image processing. The processing time indicates the time when the image processing has been performed. The processing level is divided into six levels from L0 to L5. L0 is a level indicating an uncorrected state where correction processing has not been performed, L1 is a level where a radiometric correction related to the sensitivity characteristic has been performed, and L2 is a level where a geometric correction for the orbit position, attitude error, or the like of the satellite 21 has been performed. In addition, there are a level where an image has been projected on a map projection surface, a level where an ortho-correction for correcting geometric distortion has been performed, and the like. Processing methods are described by processing names such as pan-sharpening processing, true color composition processing, and SAR image composition processing. A processed image of the three-dimensional measurement may include a description of distinction between an L image (image for a left eye) and an R image (image for a right eye).

Moreover, related person information, which is information regarding a person related to a captured image or a processed image, can be added to the metadata. The information regarding the related person includes, for example, information regarding an owner of the satellite 21, a service operator who operates a satellite remote sensing service, or a person who has a right to the captured image or the processed image. By adding the related person information as metadata to the captured image or the processed image, it is possible to manage the person related to the captured image or the processed image by referring to or collating the person related to the captured image or the processed image, and authenticity of the image can be secured.

7. Details of Distribution Management Processing

Next, the distribution management processing on a captured image or a processed image executed by the satellite cluster management device 11 or the image analysis server 42 in step S19 in FIG. 6 and step S108 in FIG. 9 will be described.

Captured images and processed images can be subjected to the following processing for managing distribution of data.

(1) Use Limitation Processing

It is possible to perform processing such that captured images and processed images cannot be downloaded or displayed without permission, or perform processing such that captured images and processed images cannot be downloaded or displayed in a case where a predetermined condition such as an expiration period, the number of times of copying, or the number of times of displays is satisfied. Furthermore, it is possible to perform the processing such that secondary processing such as image composition cannot be performed on captured images and processed images.

(2) Watermark

Processing of putting a watermark (electronic watermark) indicating copyright can be performed on captured images and processed images. Furthermore, it is possible to perform processing of putting, as a watermark, information that enables determination of a route of leakage.

By performing the distribution management processing as described above, it is possible to secure authenticity of images, and prevent leakage and inappropriate use of captured images and processed images. At this time, a method of using a blockchain to manage each piece of data and a mode of use of the data may be adopted.

(Processing Example of Image Protection)

In a case where a user has requested for privacy protection of captured images and processed images, or in a case of images including an area (disclosure-restricted area) disclosure of which is restricted or an area (prohibited area) disclosure of which is prohibited by a law or the like of each country, such as a military facility or a public facility, the satellite cluster management device 11 or the image analysis server 42 can perform processing of protecting the images by a predetermined protection method. Whether or not the area is a protected area may be determined with the use of imaging target position information of metadata.

Examples of a method of protecting an image include performing processing on an image of a protected area such that persons other than end users and permitted users cannot perform processing for increasing the resolution more than necessary. Alternatively, an image of a protected area may be decreased in resolution or blurred. Furthermore, updating of an image of a protected area may be stopped, and the image may be replaced with a past image and displayed, or an image indicating protection may be superimposed.

As for image protection, in addition to a case where the image protection is executed in advance before an image is first provided to a user, the processing can be performed later in a case where a privacy protection request has been made, in a case where distribution of an illegal image has been detected, or the like. In a case where distribution of an illegal image has been detected, it is possible to take measures to delete captured images and processed images that have been illegally leaked.

Allowing the satellite cluster management device 11 and the image analysis server 42 to perform the image protection processing as described above makes it possible to respond to a user's request for privacy protection and disclosure restriction.

8. Application Example of Formation Flight

Hereinafter, an example of image analysis processing using captured images captured by the plurality of satellites 21 constituting the satellite cluster 31 by a formation flight will be described.

(1) Checking Germination of Crops by Higher Resolution (Remote Sensing for Agriculture)

Observation for checking germination of crops requires a resolution of several centimeters. Compositing images captured by a plurality of satellites by a formation flight allows for achieving a resolving power exceeding a resolving power achieved by a single device, and this allows for detection of germination.

The satellite cluster 31 captures images with the same point in farmland as an imaging target position. The satellites 21 may simultaneously capture images from different positions, or may capture images from the same position with a time difference. In order to turn the imaging target position of each satellite 21 toward the same point, it is necessary to grasp the satellite position in advance.

In image composition processing, it is not required to grasp, for each captured image, which satellite 21 has captured the image. However, grasping which satellite 21 has captured the image makes it possible to determine the angle at the time of imaging and the time, and image composition can be performed more efficiently.

For example, a Geo TIFF format can be used as a format of a processed image after composition, and information that the processed image is a composite image by a formation flight, and the imaging position, the imaging time, the imaging conditions, and the like of each captured image used for the composition can be attached as metadata. As the information regarding the imaging position, information regarding the imaging position of any of the captured images (a representative captured image) used for the composition can be used.

(2) Checking Growth Situation of Crops by Three-Dimensional Measurement (Remote Sensing for Agriculture)

A growth situation of crops is checked on the basis of an index such as the NDVI, or can also be checked by accurately acquiring height information by three-dimensional measurement.

The satellites 21 of the satellite cluster 31 simultaneously capture images with the same point, which is farmland, as an imaging target position, and obtain a parallax image. In order to obtain the distances between the satellites, which is the baseline length, information regarding the relative position of the satellites 21 is required. This information regarding the relative position may not be obtained in advance, but may be obtained simultaneously with the downlink of the captured images.

In image composition processing, it is not required to grasp, for each captured image, which satellite 21 has captured the image. However, grasping which satellite 21 has captured the image makes it possible to determine the angle at the time of imaging and the time, and image composition can be performed more efficiently.

For a processed image after the composition, for example, a format of a three-dimensional image constituted by a set of an L image and an R image can be used, and information that the processed image is a composite image by a formation flight, and the imaging position, the imaging time, the imaging conditions, and the like of each captured image used for the composition can be attached as metadata. As the information regarding the imaging position, information regarding the imaging position of any of the captured images (a representative captured image) used for the composition can be used. In addition to information regarding the three-dimensional measurement, a vegetation index such as the NDVI or another piece of information may be further added.

(3) Other Types of Remote Sensing for Agriculture

For example, it is possible to accurately acquire height information for levelness check after tilling of farmland by three-dimensional measurement.

4) Detection of Movement of Group of Fish (Ocean Observation Remote Sensing)

A group of fish can be detected, and information regarding a moving direction and a moving speed of the group of fish can be obtained.

The satellite cluster 31 captures images with the same point in the ocean as an imaging target position. The satellites 21 capture images from the same position with a time difference. In order to turn the imaging target position of each satellite 21 toward the same point, it is necessary to grasp the satellite position in advance. Particularly in a case of imaging in which the ocean where there is no target that serves as a reference is set as an imaging target position, it is necessary to precisely align images captured by the satellites 21, and thus, it is important to grasp in advance information regarding the relative position and the moving speed of the satellites 21.

In processing of analyzing the captured images, alignment of the images captured by the satellites 21 and group of fish comparison processing are performed on the basis of the imaging positions (including angle information) and the imaging times. By performing the comparison processing, it is possible to calculate the moving speed of the group of fish from a time difference between the imaging times of the two or more satellites 21 and the moving distance of the group of fish.

As an image to be presented as an analyzed image, for example, an image can be adopted in which information indicating the moving direction and the moving speed of the group of fish is superimposed and displayed on a captured image of the group of fish serving as a base (an image captured by a predetermined satellite 21). Various types of information of the captured image serving as a base are added to the metadata.

As a result of the analysis processing, information describing a calculation method used to calculate the moving direction and the moving speed of the group of fish may be presented. Examples of this information include a plurality of captured images showing the group of fish, and information such as the imaging times of the captured images and the position of the group of fish.

(5) Other Types of Ocean Observation Remote Sensing

For example, it is also possible to obtain information regarding the moving direction and the moving speed of a ship and ocean current observation information.

(6) Counting the Number of Vehicles (Estimation of Economic Index)

An economic index (business trends or sales prediction of a specific store) is calculated by examining the number of vehicles in a parking lot and the number of vehicles running on a road. It is possible to generate a high-resolution captured image by compositing images captured by a plurality of satellites by a formation flight and more accurately detect the number of vehicles or the number of running vehicles.

The satellite cluster 31 simultaneously captures images with the same point as an imaging target position. In order to turn the imaging target position of each satellite 21 toward the same point, it is necessary to grasp the satellite position in advance. By using a plurality of captured images that have been captured simultaneously, it is possible to increase the resolution of an image and acquire three-dimensional information based on a parallax image.

In image composition processing, it is not required to grasp, for each captured image, which satellite 21 has captured the image. However, grasping which satellite 21 has captured the image makes it possible to determine the angle at the time of imaging and the time, and image composition can be performed more efficiently. In a case of composition from two or more captured images, a target object that serves as a reference may be extracted from a road or a building in the images, and the two or more images may be aligned on the basis of the extracted target object. The target object that serves as a reference may be selected on the basis of height information.

In image analysis processing, the number of vehicles or the number of running vehicles is calculated on the basis of a captured image in which the resolution has been increased. The number of vehicles or the number of running vehicles may be efficiently calculated by increasing the resolution only in a specific region in the captured image. In a case where it is not possible to determine whether or not a target object is a vehicle from a two-dimensional image, the determination of whether or not the target object is a vehicle may be made on the basis of three-dimensional information including the height.

As an image to be presented as an analyzed image, for example, it is possible to adopt an image in which a captured image serving as a base (an image captured by a predetermined satellite 21) is colored in different colors for each detection target area or each count target (vehicles or persons), and the number of counts is superimposed and displayed. Various types of information of the image serving as a base are given to the metadata.

As a result of the analysis processing, information such as an imaging condition of the image or a calculation method for the object to be detected may be presented to a user.

Note that the above-described example is an example of increasing the resolution by simultaneous imaging, and it is also possible to measure the moving speed of a vehicle on the basis of captured images captured with a time difference, and estimate and present traffic volume information before and after the imaging time.

(7) Others

By compositing images captured by a plurality of satellites by a formation flight, it is possible to acquire three-dimensional information based on a parallax image, and create a three-dimensional map of a construction site or a house.

(8) Modified Example

A constellation of a formation flight may be used. That is, by putting the satellite cluster 31 that performs a formation flight into a single or a plurality of orbital planes, it is possible to perform an operation of mainly deploying a uniform global service.

Image composition of an image captured by the formation flight and an image captured by another satellite may be performed. For example, it is possible to perform image processing in which moving object information obtained by the formation flight is superimposed and displayed on a high-resolution image captured by a geostationary satellite.

9. Second Embodiment of Satellite Image Processing System

Figure 11:
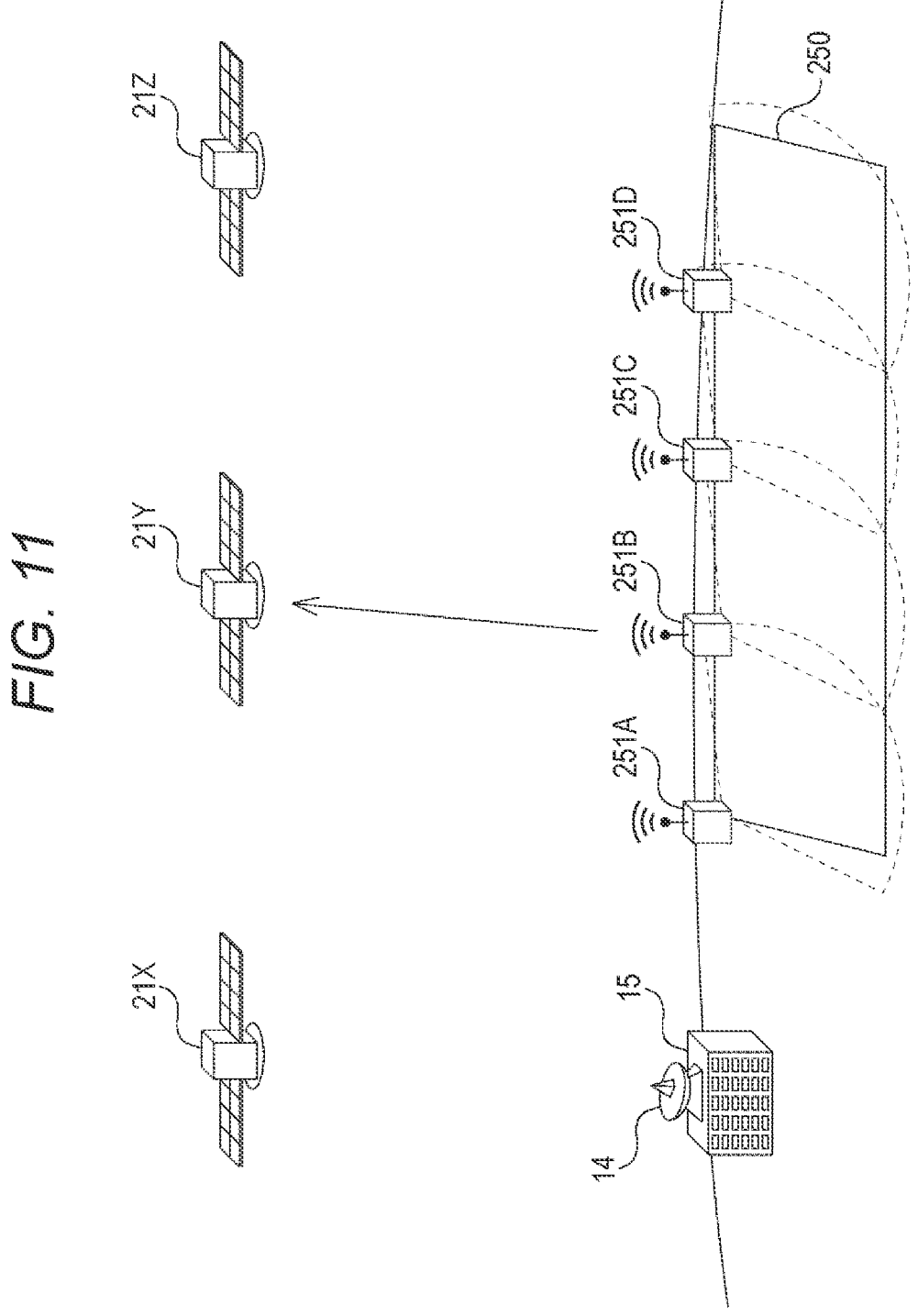
FIG. 11 is a diagram illustrating a configuration example of a second embodiment of a satellite image processing system to which the present technology is applied.

FIG. 11 illustrates a configuration example of a second embodiment of a satellite image processing system to which the present technology is applied.

In the first embodiment described above, the satellite cluster 31 that performs a formation flight is configured to perform simultaneous imaging or imaging with a time difference at an imaging point or an imaging time instructed in advance on the basis of orbit information or the like of the satellite 21. Therefore, for example, it is not possible to detect a predetermined event that has occurred on the ground and perform real-time imaging at the time of occurrence of the event.

In the second embodiment described below, a configuration in which one or more satellites 21 perform real-time imaging in accordance with an event that has occurred on the ground will be described. In a case where a satellite cluster 31 including a plurality of the satellites 21 performs real-time imaging in accordance with an event that has occurred on the ground, the satellite cluster 31 may be operated by either a constellation or a formation flight.

In the configuration of a satellite image processing system 1 of the second embodiment, as illustrated in FIG. 11, a plurality of transmission devices 251 including a sensor that detects a predetermined event on the ground is newly added. In the example in FIG. 11, four transmission devices 251A to 251D are installed in an event detection region 250, but the number of transmission devices 251 is optional. Note that three satellites 21X to 21Z of the second embodiment illustrated in FIG. 11 may be operated by either a constellation or a formation flight. Furthermore, the three satellites 21X to 21Z may be independently operated satellites 21.

The event detection region 250 is divided and assigned to each of the four transmission devices 251A to 251D for event detection. A fan-shaped region indicated by a broken line in FIG. 11 indicates an event detection range of one transmission device 251. The event detection region 250 is, for example, farmland, and the sensors included in the transmission devices 251 monitor the temperature and the like of the farmland, or monitor a growth situation of crops.

The transmission devices 251 detect a predetermined event in the event detection region 250, and transmit an imaging instruction to one or more satellites 21. The satellites 21X to 21Z image an occurrence region of the event in accordance with the imaging instruction transmitted from the transmission devices 251.

Figure 12:
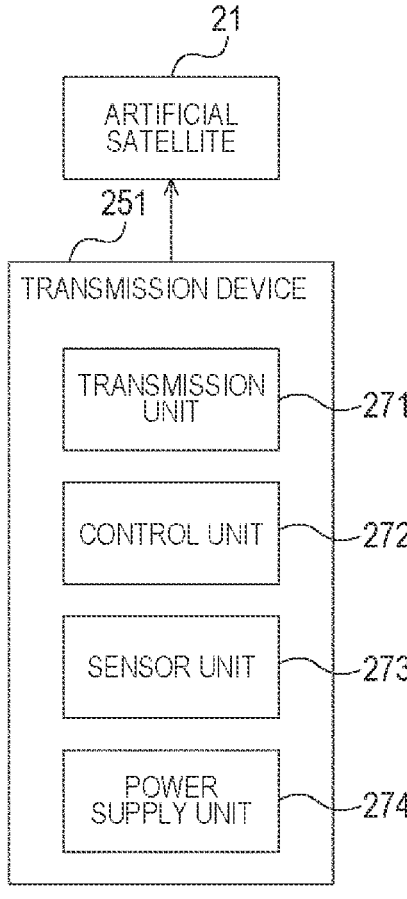
FIG. 12 is a block diagram illustrating a configuration example of a transmission device according to the second embodiment.

FIG. 12 is a block diagram illustrating a configuration example of the transmission device 251.

The transmission device 251 includes a transmission unit 271, a control unit 272, a sensor unit 273, and a power supply unit 274.

In accordance with the control of the control unit 272, the transmission unit 271 transmits an imaging instruction to a satellite 21 passing through the vicinity of the transmission device 251.

The transmission unit 271 is, for example, omnidirectional, and can transmit an imaging instruction to all the satellites 21 passing through a certain range of the transmission device 251. The transmission unit 271 is constituted by, for example, a communication device that can communicate with an object moving at a high speed of 100 km/h over a long distance of 100 km or more, and consumes less power.

The transmission unit 271 may be directional. In this case, the transmission unit 271 directs an antenna (not illustrated) toward a satellite 21 passing through the vicinity of the transmission device 251 on the basis of orbit information of the satellite 21, and transmits an imaging instruction to the target satellite 21. The orbit information of the satellite 21 is stored in advance.

The control unit 272 controls the entire operation of the transmission device 251. In a case where a predetermined event has been detected by the sensor unit 273, the control unit 272 performs control to cause the transmission unit 271 to transmit an imaging instruction to the satellite 21.

The sensor unit 273 is constituted by one or more types of predetermined sensors in accordance with the purpose of event detection. For example, the sensor unit 273 is constituted by an odor sensor, an atmospheric pressure sensor, a temperature sensor, and the like. Furthermore, for example, the sensor unit 273 may be constituted by an image sensor (RGB sensor, IR sensor, or the like) that images the event detection region 250. For example, when a detection value is equal to or more than a predetermined threshold, the sensor unit 273 detects occurrence of an event, and notifies the control unit 272 of the occurrence of the event.

Note that the sensor unit 273 may be disposed close to the transmission unit 271, or may be disposed away from the transmission unit 271 in such a way that, for example, the transmission unit 271 is disposed at a high place closest to the satellite 21, and the sensor unit 273 is disposed at a low place close to the ground.

A plurality of sensors of different types may be mounted on one transmission device 251, or a plurality of sensors of the same type may be mounted. In a case where a plurality of sensors is mounted on the transmission device 251, there is a case where it is necessary to transmit a sensor detection result with sensor information such as a sensor detection range as an imaging target position or a sensor detection type as transmission information added.

The power supply unit 274 is constituted by, for example, a battery charged by solar power generation or the like, and supplies power to each unit of the transmission device 251.

The transmission device 251 is a communication device that has a configuration as described above and allows for only unidirectional communication from the transmission device 251 to the satellite 21, but may also be a communication device that allows for bidirectional communication including a direction from the satellite 21 to the transmission device 251.

In both the one-way communication and the bidirectional communication, in a case where the communication is omnidirectional, it is not necessary for a transmission side to direct an antenna toward the satellite 21 or a ground station 15, which is a reception side, and thus such communication is preferable particularly in a case of transmission from the ground to the satellite 21 overhead. In the present embodiment, it is assumed that the transmission unit 271 of the transmission device 251 is omnidirectional and the transmission device 251 is a device that performs one-way communication. However, as a matter of course, the transmission device 251 may be a directional device that performs bidirectional communication.

10. First Event Imaging Sequence of Second Embodiment

Next, a first event imaging sequence performed by the satellite image processing system 1 of the second embodiment will be described with reference to a flowchart in FIG. 13.

First, in step S141, the control unit 272 of the transmission device 251 determines whether an event has been detected by the sensor unit 273. When the sensor unit 273 detects a predetermined event and notifies the control unit 272 of occurrence of the event, the control unit 272 determines that an event has been detected. Thus, in step S141, the control unit 272 waits until a notification of occurrence of an event is received from the sensor unit 273. If it is determined that an event has been detected, the processing proceeds from step S141 to step S142.

In response to the occurrence of the event, in step S142, the control unit 272 controls the transmission unit 271 to transmit an imaging instruction to a satellite 21 passing through the vicinity of the transmission device 251. The transmission unit 271 transmits the imaging instruction in response to a command from the control unit 272.

Since the communication between the transmission device 251 and the satellite 21 is one-way communication only from the ground side to the satellite 21, the transmission device 251 cannot check whether or not the satellite 21 has received the imaging instruction. Therefore, the transmission device 251 continues to transmit the imaging instruction for a certain period of time such as thirty minutes or one hour, or repeatedly transmits the imaging instruction intermittently at a certain time interval. In a case where the transmission device 251 and the satellite 21 can perform bidirectional communication, as in the imaging sequence described with reference to FIG. 6, a reception completion may be received from the satellite 21, and then the transmission of the imaging instruction may be stopped. The reception completion from the satellite 21 to the transmission device 251 may include information that the satellite 21 will capture an image.

Furthermore, in the present imaging sequence, when occurrence of an event has been detected, the transmission device 251 transmits an imaging instruction without selecting a satellite 21. Alternatively, in a case where orbit information and an imaging capability of a satellite 21 passing overhead are known, the transmission device 251 may transmit an imaging instruction in which the satellite cluster 31 or the satellite 21 that satisfies requested imaging conditions is designated by the cluster ID or the individual ID.

The imaging instruction from the transmission device 251 to the satellite 21 is transmitted with imaging-related information such as requested imaging conditions, a requested imaging target position, a sensor ID, an event occurrence time, and a detected event type added as parameters. The requested imaging conditions include, for example, resolution and a wavelength band (RGB, IR, or the like). The requested imaging target position represents a region on the ground to be imaged, and corresponds to an occurrence region of the event of the sensor unit 273. An installation position of the transmission device 251 or the sensor unit 273 may be stored as the requested imaging target position. The sensor ID is sensor identification information for identifying the sensor unit 273 that has detected the event. The event occurrence time is a time at which the sensor unit 273 has detected the event, and corresponds to a time at which a request has been made as the imaging instruction. The detected event type indicates, for example, the type of event detected by the sensor unit 273, such as detection of an abnormal temperature. The detected event type may store the sensor type instead of a specific type of the detected event.

In step S161, the satellite 21 receives the imaging instruction from the transmission device 251, and in step S162, determines whether imaging by itself is possible. The satellite 21 checks whether or not the requested imaging conditions added to the imaging instruction are satisfied, and determines whether imaging by itself is possible. If it is determined in step S162 that imaging by itself is not possible, the satellite 21 ends the processing.

On the other hand, if it is determined in step S162 that imaging by itself is possible, the processing proceeds to step S163, and the satellite 21 performs imaging preparation processing based on the received imaging instruction. Subsequently, the satellite 21 captures an image in step S164, and generates metadata and adds the metadata to the captured image in step S165. Since each piece of processing in steps S163 to S165 is basically similar to each piece of processing in steps S33 to S35 in FIG. 6 described above, the details thereof will be omitted. The metadata can include a part or all of the information received from the transmission device 251. For example, information such as the sensor ID indicating the sensor unit 273 or the event occurrence time can be included as the metadata.

In step S166, the satellite 21 determines whether the satellite 21 has arrived at a downlink point, in other words, whether the satellite 21 has arrived within a range in which communicate with a communication device 13 of the ground station 15 is possible. The satellite 21 repeats the processing in step S166 until it is determined that the satellite 21 has arrived at the downlink point. If it is determined that the satellite 21 has arrived at the downlink point, the processing proceeds to step S167.

In step S167, the satellite 21 transmits (downlinks) the captured image to which the metadata has been added to the ground station 15. The downlink may be performed via a relay satellite 22.

In step S181, a management system receives the captured image from the satellite 21. That is, the communication device 13 receives the captured image via an antenna 14, and supplies the captured image to a satellite cluster management device 11. After receiving the captured image, the management system performs processing similar to that in steps S17 to S19 in FIG. 6, and the description thereof will not be repeated.

11. Second Event Imaging Sequence of Second Embodiment

Next, a second event imaging sequence performed by the satellite image processing system 1 of the second embodiment will be described with reference to a flowchart in FIG. 14.

In the first event imaging sequence described above, each satellite 21 individually determines whether or not imaging is possible, and transmits a captured image to the communication device 13 on the ground in a case where imaging is performed.

In the second event imaging sequence in FIG. 14, processing has been added in which, in a case where a satellite 21 that has received an imaging instruction determines that imaging by itself is not possible, a subsequent satellite 21 takes over the imaging instruction. The subsequent satellite 21 is, for example, a satellite 21 belonging to the same satellite cluster 31 operated in a constellation or a formation flight. In the second event imaging sequence described below, the satellite 21 that receives the imaging instruction is referred to as the first satellite 21, and the subsequent satellite 21 that takes over the imaging instruction is referred to as the second satellite 21 for distinction.

Detection of occurrence of an event in steps S141 and S142 and transmission of an imaging instruction by the transmission device 251 are the same as those in the first event imaging sequence described above.

In step S201, the first satellite 21 receives the imaging instruction from the transmission device 251, and in step S202, determines whether imaging by itself is possible. if it is determined in step S202 that imaging by itself is possible, the processing proceeds to step S203, and the first satellite 21 performs imaging based on the imaging instruction and transmission, and the processing ends. The imaging sequence in a case where it is determined that imaging by itself is possible is the same as that in the first event imaging sequence described above, and thus, description thereof will be omitted.

On the other hand, if it is determined in step S202 that imaging by itself is not possible, the processing proceeds to step S204, and the first satellite 21 determines whether imaging by the subsequent second satellite 21 belonging to the satellite cluster 31 of the first satellite 21 is possible. If it is determined in step S204 that imaging by the second satellite 21 is not possible, the processing ends.

If it is determined in step S204 that imaging by the second satellite 21 is possible, the processing proceeds to step S205, and the first satellite 21 transmits the imaging instruction to the subsequent second satellite 21 by inter-satellite communication.

Then, in step S206, the first satellite 21 determines whether the first satellite 21 has arrived at the downlink point, and repeats the processing in step S206 until it is determined that the first satellite 21 has arrived at the downlink point.

Then, if it is determined in step S206 that the first satellite 21 has arrived at the downlink point, the processing proceeds to step S207, and the first satellite 21 transmits (downlinks), to the ground station 15, event detection data included in the imaging instruction received from the transmission device 251. The event detection data includes a part or all of imaging-related information included in the imaging instruction, information that the imaging instruction has been transferred to the subsequent satellite, and information indicating the subsequent second satellite 21 to which the imaging instruction has been transferred. The downlink may be performed via the relay satellite 22 in a similar manner to another piece of processing described above. Thus, the processing by the first satellite 21 ends.

The subsequent second satellite 21 to which the imaging instruction has been transmitted from the first satellite 21 by inter-satellite communication receives the imaging instruction in step S221, and performs imaging preparation processing based on the received imaging instruction in step S222.

Figure 13:
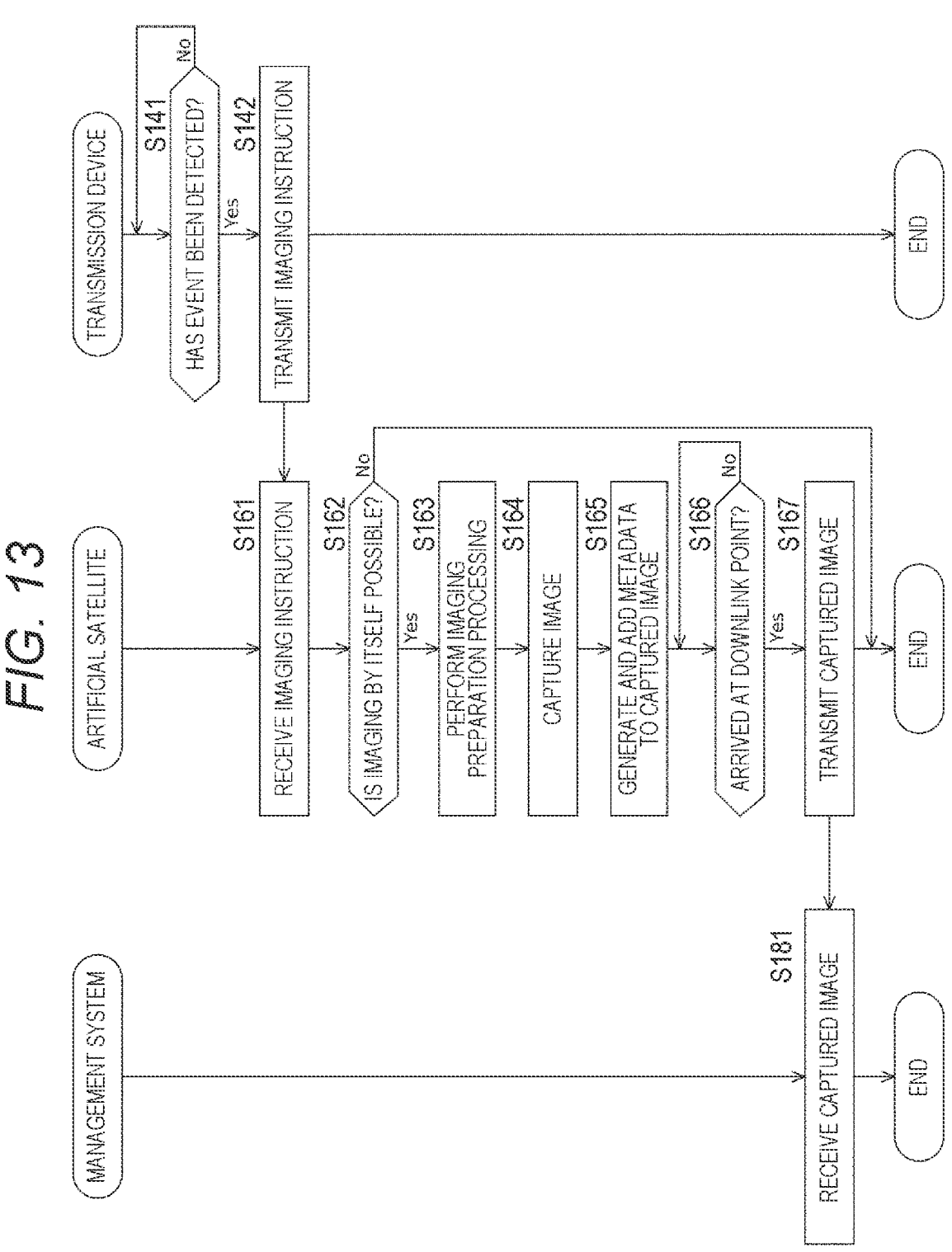
FIG. 13 is a flowchart illustrating a first event imaging sequence by the satellite image processing system of the second embodiment.

The processing in steps S223 to S226 is similar to the processing in steps S164 to S167 in FIG. 13. By the processing in steps S223 to S226, imaging is performed, a captured image and metadata are generated, and the captured image to which the metadata has been added is transmitted to the ground station 15 at the time of arrival at the downlink point.

On the other hand, in response to the transmission of the event detection data by the first satellite 21, the management system receives the event detection data in step S241. Furthermore, in response to the transmission of the captured image by the second satellite 21, the captured image is received in step S242. After receiving the captured image, the management system performs processing similar to that in steps S17 to S19 in FIG. 6, and the description thereof will not be repeated.

12. Third Event Imaging Sequence of Second Embodiment

Figure 15:
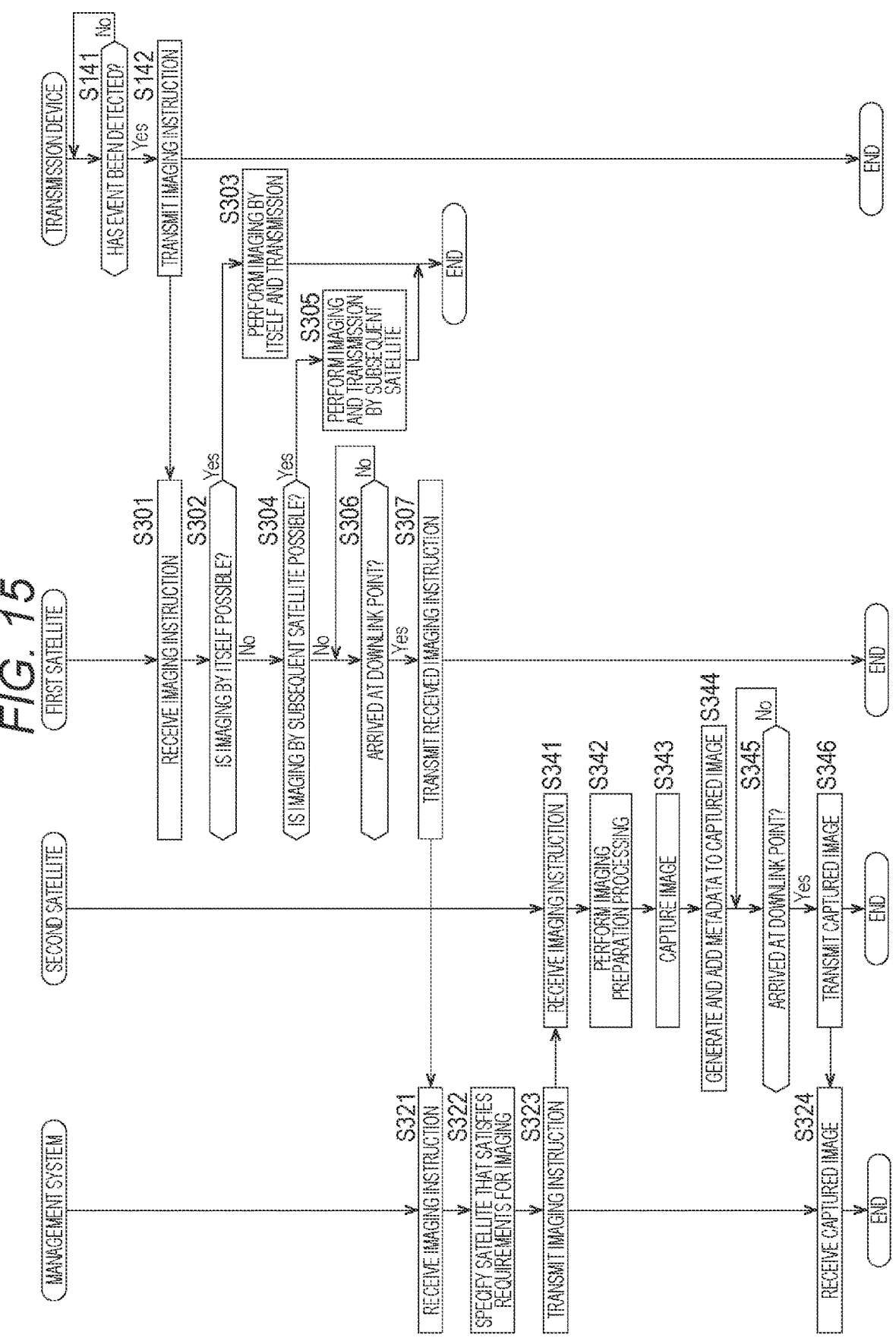
FIG. 15 is a flowchart illustrating a third event imaging sequence by the satellite image processing system of the second embodiment.

Next, a third event imaging sequence performed by the satellite image processing system 1 of the second embodiment will be described with reference to a flowchart in FIG. 15.

In the second event imaging sequence described above, inter-satellite communication is used for transfer of an imaging instruction from the first satellite 21 to the second satellite 21. The third event imaging sequence is an example in which communication via the ground station 15 is used for transfer of an imaging instruction from the first satellite 21 to the second satellite 21.

Detection of occurrence of an event in steps S141 and S142 and transmission of an imaging instruction by the transmission device 251 are the same as those in the first event imaging sequence described above.

In step S301, the first satellite 21 receives the imaging instruction from the transmission device 251, and in step S302, determines whether imaging by itself is possible. If it is determined in step S302 that imaging by itself is possible, the processing proceeds to step S303, and the first satellite 21 performs imaging based on the imaging instruction and transmission, and the processing ends. The imaging sequence in a case where it is determined that imaging by itself is possible is the same as that in the first event imaging sequence described above, and thus, description thereof will be omitted.

On the other hand, if it is determined in step S302 that imaging by itself is not possible, the processing proceeds to step S304, and the first satellite 21 determines whether imaging by the subsequent satellite 21 belonging to the satellite cluster 31 of the first satellite 21 is possible. If it is determined in step S304 that imaging by the subsequent satellite 21 is possible, the processing proceeds to step S305, imaging and transmission by the subsequent satellite 21 are performed, and the processing ends. An imaging sequence in a case where it is determined that imaging by the subsequent satellite 21 is possible is the same as that in the above-described second event imaging sequence, and thus, description thereof will be omitted.

If it is determined in step S304 that imaging by the subsequent satellite 21 is not possible, the processing proceeds to step S306, and the first satellite 21 determines whether the first satellite 21 has arrived at the downlink point, and repeats the processing in step S306 until it is determined that the first satellite 21 has arrived at the downlink point.

Then, if it is determined in step S306 that the first satellite 21 has arrived at the downlink point, the processing proceeds to step S307, and the first satellite 21 transmits (downlinks), to the ground station 15, the imaging instruction received from the transmission device 251. The downlink may be performed via the relay satellite 22 in a similar manner to another piece of processing described above. Thus, the processing by the first satellite 21 ends.

In response to the transmission of the imaging instruction by the first satellite 21, the management system receives the imaging instruction in step S321. Then, in step S322, the management system specifies another satellite 21 that satisfies requirements for imaging on the basis of the requested imaging conditions, the requested imaging target position, and the like included in the imaging-related information of the imaging instruction. Here, the second satellite 21 is specified as the other satellite 21.

In step S323, the management system transmits the imaging instruction to the specified second satellite 21. Note that the ground station 15 (the communication device 13 thereof) that receives the imaging instruction from the first satellite 21 and the ground station 15 (the communication device 13 thereof) that transmits the imaging instruction to the second satellite 21 may be the same, or may be different.

In step S341, the second satellite 21 receives the imaging instruction from the ground station 15. The processing in the following steps S342 to S346 is similar to the processing in steps S222 to S226 in FIG. 14, and thus, description thereof will be omitted. In step S346, the captured image is transmitted from the second satellite 21 to the management system.

In step S324, the management system receives the captured image, and the third event imaging sequence ends.

In the third event imaging sequence described above, the first satellite 21 transmits the imaging instruction to the ground station 15 if it is determined that imaging by the subsequent satellite 21 is not possible. Alternatively, the first satellite 21 may transmit the imaging instruction to the ground station 15 if it is determined that imaging by itself is not possible, without determining whether or not imaging by the subsequent satellite 21 is possible.

According to the third event imaging sequence, even in a case where the requested imaging target position is a place where connection to a network is not available, such as on the sea, an imaging instruction can be transmitted to the management system via the first satellite 21, and imaging can be performed by the second satellite 21.

13. Another Configuration Example of Transmission Device

The transmission device 251 illustrated in FIG. 12 has the built-in sensor that detects occurrence of an event, and is configured integrally with the transmission unit that transmits an imaging instruction. However, the sensor that detects occurrence of an event and the transmission device that transmits an imaging instruction can be constituted by separate devices.

Figure 16:
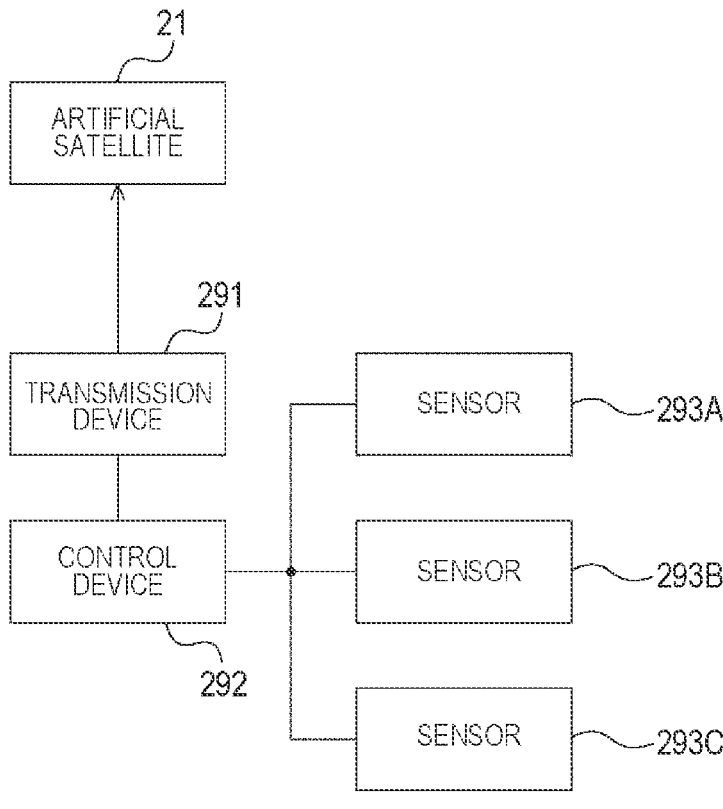
FIG. 16 is a block diagram illustrating another configuration example of the transmission device according to the second embodiment.

FIG. 16 is a block diagram illustrating another configuration example of the transmission device according to the second embodiment.

In the event detection region 250 (FIG. 11), a transmission device 291, a control device 292, and one or more sensors 293 are installed. FIG. 16 illustrates an example in which the number of the sensors 293 is three, which is constituted by sensors 293A to 293C, but the number of sensors 293 is optional. Furthermore, a plurality of sets of the transmission device 291, the control device 292, and one or more sensors 293 may be installed in the event detection region 250.

In accordance with the control of the control device 292, the transmission device 291 transmits an imaging instruction to a satellite 21 passing through the vicinity of the transmission device 291.

In a case where a predetermined event has been detected by any one of a plurality of sensors 293 (293A to 293C), the control device 292 acquires an event detection result from the sensor 293, generates an imaging instruction, and performs control to cause the transmission device 291 to transmit the imaging instruction. In a similar manner to the above-described example, imaging-related information is added to the imaging instruction as parameters.

Each one of the plurality of sensors 293 (293A to 293C) corresponds to the sensor unit 273 described above, detects occurrence of an event, and notifies the control device 292 of the occurrence of the event. The plurality of sensors 293 may be constituted by different types of sensors, or may be sensors of the same type. The plurality of sensors 293 may be disposed close to or away from each other. Furthermore, the plurality of sensors 293 may be disposed close to or away from the transmission device 291 and the control device 292. The above-described sensor information is added to a notification of occurrence of an event from the sensors 293 to the control device 292 as necessary.

In the satellite image processing system 1 of the second embodiment, even in a case where the transmission device 291 and the sensors 293 are configured as separate devices as described above, the first to third event imaging sequences described above can be executed in a similar manner.

14. Application Examples of Satellite Image Processing System Using Event Detection Sensor Hereinafter, application examples of the satellite image processing system using the event detection sensor of the second embodiment will be described.

(1) Event Detection in Farmland

A plurality of sensors (the transmission device 251 including the sensor unit 273, or the sensors 293) is installed at a certain interval in a predetermined observation region in farmland, and each one of the plurality of sensors detects an abnormality such as vermination or occurrence of a disease. The transmission device 251 or 291 transmits an imaging instruction to the satellite 21 in accordance with a result of detection of an abnormality in the farmland as an event. The satellite 21 performs, for example, imaging of RGB, imaging of red (R) and infrared (IR) for a vegetation index such as the NDVI, or the like. The sensor detection range of the sensor that has detected the abnormality is assigned to the requested imaging target position added to the imaging instruction. The satellite 21 that has received the imaging instruction may image only the sensor detection range of the sensor in which the abnormality has occurred, in the observation region in which the plurality of sensors is disposed, or may perform wide-area imaging of the entire observation region. Furthermore, an imaging condition such as zoom may be changed so that both imaging of the sensor detection range of the sensor that has detected the abnormality and wide-area imaging of the entire observation region may be performed.

It is also possible to give an imaging instruction to the satellite 21 by using, as a trigger, occurrence of a predetermined situation for checking a growing situation, such as the ground surface having got into a predetermined environmental state (e.g., the temperature of the ground surface having reached a predetermined temperature), an amount of photosynthesis or a growth situation of a plant having got into a predetermined state, or germination having been detected, instead of detection of an abnormality.

(2) Event Detection in Ocean

For example, a buoy incorporating the transmission device 251 including the sensor unit 273 is released into a sea area to be investigated in the ocean. The sensor unit 273 detects a group of fish, or detects a predetermined condition such as a sea water temperature, an ocean current speed, or a wind speed. On the basis of a result of the event detection, the transmission device 251 transmits an imaging instruction to the satellite 21. Imaging-related information of the imaging instruction includes requested imaging conditions, a requested imaging target position, an event occurrence time, and the like. Since satellites 21 that can image a state during the night are limited, a satellite 21 is selected on the basis of the requested imaging conditions, and a situation of an imaging target sea area is analyzed on the basis of a captured image.

(3) Observation of Uninhabited Zone

A sensor (the transmission device 251 including the sensor unit 273, or the sensor 293) is installed in an uninhabited zone such as a forest, a mountain, or a desert, and an abnormality such as a change in climatic condition, detection of an organism to be observed, or a forest fire is detected. The satellite 21 captures an image on the basis of an imaging instruction from the transmission device 251 or 291. On the basis of the captured image, the situation of the uninhabited zone is analyzed.

(4) Accident Observation

For example, the transmission device 251 is mounted on a black box of an airplane or a ship, and the transmission device 251 transmits an imaging instruction in the event of an emergency such as a crash of the airplane, ship grounding, or a leak from an oil tanker. The satellite 21 promptly captures an image of the place where the emergency has occurred, and transmits the image to the ground station 15.

(5) Stranded Mountain Climber

When a mountain climber or the like carrying the transmission device 251 is stranded, the transmission device 251 transmits, to the satellite 21, an imaging instruction to which imaging-related information including a distress signal as a detected event type and including the place where the stranding has occurred as a requested imaging target position is added. The satellite 21 captures an image of the place where the stranding has occurred on the basis of the imaging instruction, and transmits the image to the ground station 15.

(6) Pipeline Emission Control

Sensors are attached to a pipeline at a predetermined interval, and occurrence of a leak is monitored. In a case where a leak has been detected, an imaging instruction is transmitted to the satellite 21. An imaging instruction is transmitted with imaging-related information designating a satellite 21 capable of detecting a leak, such as a satellite 21 capable of detecting heat by an IR band, added as requested imaging conditions, and a satellite 21 that satisfies requirements captures an image. It is possible to promptly observe the situation of the leak in the area of the leak on the basis of the captured image. In particular, in a case where the leakage from the pipeline is human-caused, prompt observation after occurrence of the event is effective.

(7) Others

A captured image triggered by the sensor 293 disposed on the ground may be used only as primary information, and the captured image may be combined with another image for image analysis or the like. For example, a captured image triggered by the sensor 293 is promptly captured by a low-performance satellite 21 with priority given to the timing of imaging. Thereafter, the satellite cluster management device 11 sets a schedule of a satellite 21 having a higher imaging capability for high-resolution and high-accuracy imaging. The satellite cluster management device 11 performs analysis by using the first captured image captured by the low-performance satellite 21 and the second captured image captured by the satellite 21 having a higher imaging capability. For example, the satellite cluster management device 11 may increase the resolution of the first captured image on the basis of differential information, or may perform processing of compositing the first captured image and the second captured image.

As described above, according to satellite remote sensing using a sensor, an event that has occurred on the ground can be detected by the sensor, and an imaging instruction can be directly given to a satellite 21 overhead. In particular, even from a sensor installed in an area that is not connected to the Internet such as the ocean, an imaging instruction can be directly given to a satellite, or an imaging instruction can be given via a satellite to another satellite. For example, since it is possible to instantly detect an event that has occurred at a specific place in a vast area and cause imaging to be performed, labor can be greatly reduced.

15. Configuration Example of Computer

The series of pieces of processing described above can be executed not only by hardware but also by software. In a case where the series of pieces of processing is executed by software, a program constituting the software is installed on a computer. Here, the computer includes a microcomputer incorporated in dedicated hardware, or a general-purpose personal computer capable of executing various functions with various programs installed therein, for example.

Figure 17:
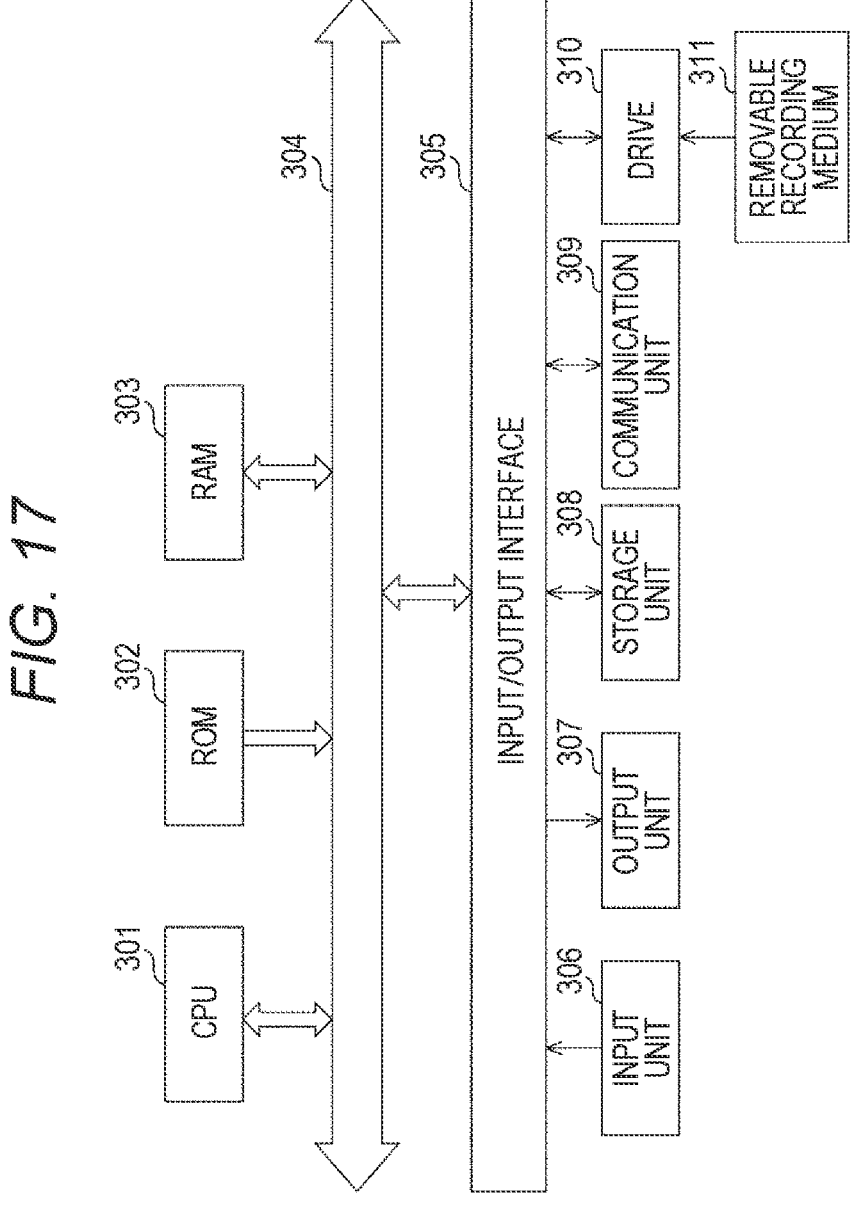
FIG. 17 is a block diagram illustrating a configuration example of one embodiment of a computer to which the present technology is applied.

FIG. 17 is a block diagram illustrating a configuration example of hardware of a computer that executes the series of pieces of processing described above in accordance with a program.

In the computer, a central processing unit (CPU) 301, a read only memory (ROM) 302, and a random access memory (RAM) 303 are connected to each other by a bus 304.

The bus 304 is further connected with an input/output interface 305. The input/output interface 305 is connected with an input unit 306, an output unit 307, a storage unit 308, a communication unit 309, and a drive 310.

The input unit 306 includes a keyboard, a mouse, a microphone, a touch panel, an input terminal, or the like. The output unit 307 includes a display, a speaker, an output terminal, or the like. The storage unit 308 includes a hard disk, a RAM disk, a nonvolatile memory, or the like. The communication unit 309 includes a network interface or the like. The drive 310 drives a removable recording medium 311 such as a magnetic disk, an optical disk, a magneto-optical disk, or a semiconductor memory.

To perform the series of pieces of processing described above, the computer configured as described above causes the CPU 301 to, for example, load a program stored in the storage unit 308 into the RAM 303 via the input/output interface 305 and the bus 304 and then execute the program.

The RAM 303 also stores, as appropriate, data or the like necessary for the CPU 301 to execute various types of processing.

The program to be executed by the computer (CPU 301) can be provided by, for example, being recorded on the removable recording medium 311 as a package medium or the like. Furthermore, the program can be provided via a wired or wireless transmission medium such as a local area network, the Internet, or digital satellite broadcasting.

Inserting the removable recording medium 311 into the drive 310 allows the computer to install the program into the storage unit 308 via the input/output interface 305. Furthermore, the program can be received by the communication unit 309 via a wired or wireless transmission medium and installed into the storage unit 308. In addition, the program can be installed in advance in the ROM 302 or the storage unit 308.

In the present specification, the steps described in the flowcharts may be of course performed in chronological order in the order described, or may not necessarily be processed in chronological order. The steps may be executed in parallel, or at a necessary timing such as in a case where called.

Furthermore, in the present specification, a system means a set of a plurality of components (devices, modules (parts), and the like), and it does not matter whether or not all components are in the same housing. Thus, a plurality of devices housed in separate housings and connected via a network, and one device having a plurality of modules housed in one housing are both systems.

Embodiments of the present technology are not limited to the embodiments described above but can be modified in various ways within a scope of the present technology.

For example, it is possible to adopt a mode in which all or some of the plurality of embodiments described above are combined.

For example, the present technology can have a cloud computing configuration in which a plurality of devices shares one function and collaborates in processing via a network.

Furthermore, each step described in the flowcharts described above can be executed by one device or can be shared by a plurality of devices.

Moreover, in a case where a plurality of pieces of processing is included in one step, the plurality of pieces of processing included in that step can be executed by one device or can be shared by a plurality of devices.

Note that the effects described in the present specification are merely examples and are not restrictive, and effects other than those described in the present specification may be obtained.

Note that the present technology can be configured as described below.

(1)

An image management method including:

adding, by a management device that manages a captured image captured by a satellite, metadata that includes at least information regarding a person related to the captured image, to the captured image.

(2)

The image management method according to (1), in which the related person information includes information regarding any of an owner of the satellite, a service operator using the satellite, or a person who has a right to the captured image.

(3)

The image management method according to (1) or (2), in which the management device performs use limitation processing on the captured image.

(4)

The image management method according to (1) or (2), in which the management device performs watermark processing on the captured image.

(5)

The image management method according to any one of (1) to (4), in which the management device receives, from the satellite, the captured image to which the metadata is added.

(6)

The image management method according to any one of (1) to (4), in which the management device receives the metadata from the satellite as a stream different from the captured image.

(7)

The image management method according to any one of (1) to (6), in which the metadata includes a satellite identifier for identifying the satellite and a satellite cluster identifier for identifying a satellite cluster that includes the satellite.

(8)

The image management method according to any one of (1) to (7), in which the metadata includes information regarding a relative position with respect to each satellite constituting a satellite cluster.

(9)

The image management method according to (8), in which the information regarding the relative position includes an arrangement sequence of each satellite constituting the satellite cluster and distances between the satellites.

(10)

The image management method according to any one of (1) to (9), in which the metadata includes information regarding imaging contents of imaging by the satellite.

(11)

The image management method according to (10), in which the information regarding the imaging contents includes at least any one of imaging target position information, an imaging condition, an image sensor type, an imaging time, or a satellite position at time of imaging.

(12)

The image management method according to any one of (1) to (11), in which the metadata includes information regarding an image type of the captured image.

(13)

The image management method according to (12), in which the information regarding the image type of the captured image includes image processing information.

(14)

A data structure of metadata of a captured image captured by a satellite, in which the metadata includes at least information regarding a person related to the captured image, and a management device that manages the captured image is used for processing of collating the person related to the captured image.

(15)

The data structure of metadata according to (14), in which the metadata is attached to the captured image.

REFERENCE SIGNS LIST

1 Satellite image processing system
11 Satellite cluster management device
13 Communication device
14 Antenna
15 Ground station (base station)
21 Satellite
31 Satellite cluster
41 Information provision server
42 Image analysis server
101 Management unit
111 Imaging device
211 Control unit
222 Control unit
231 Control unit
250 Event detection region
251 Transmission device
271 Transmission unit
272 Control unit
273 Sensor unit
291 Transmission device
292 Control device
293 Sensor
301 CPU
302 ROM
303 RAM
306 Input unit
307 Output unit
308 Storage unit
309 Communication unit
310 Drive

The invention claimed is:

1. An image management method, comprising:

adding, by a management device that manages a captured image captured by a satellite, metadata to the captured image, wherein the metadata includes:

first information regarding a first person associated with the captured image, a satellite cluster identifier for identifying a satellite cluster that includes the satellite, and second information regarding imaging contents of imaging by the satellite, the second information regarding the imaging contents includes a satellite position at a time of the imaging, the satellite position at the time of the imaging includes information regarding an accuracy of an attitude control by the satellite at the time of the imaging, and the management device receives the metadata from the satellite as a stream different from the captured image.

2. The image management method according to claim 1, wherein the first information includes information regarding one of an owner of the satellite, a service operator using the satellite, or a second person who has a right to the captured image.

3. The image management method according to claim 1, wherein the management device performs use limitation processing on the captured image.

4. The image management method according to claim 1, wherein the management device performs watermark processing on the captured image.

5. The image management method according to claim 1, wherein the management device receives, from the satellite, the captured image to which the metadata is added.

6. The image management method according to claim 1, wherein the metadata further includes a satellite identifier for identifying the satellite.

7. The image management method according to claim 1, wherein the metadata further includes third information regarding a relative position with respect to each satellite constituting the satellite cluster.

8. The image management method according to claim 7, wherein the third information regarding the relative position includes an arrangement sequence of each satellite constituting the satellite cluster and distances between a plurality of satellites in the satellite cluster.

9. The image management method according to claim 1, wherein the second information regarding the imaging contents further includes at least one of imaging target position information, an imaging condition, an image sensor type, or the time of the imaging.

10. The image management method according to claim 1, wherein the metadata further includes third information regarding an image type of the captured image.

11. The image management method according to claim 10, wherein the third information regarding the image type of the captured image includes image processing information.

12. The image management method according to claim 1, wherein the metadata further includes third information regarding a latitude and a longitude of an imaging target position at the time of the imaging by the satellite.

13. An image processing system, comprising:

a central processing unit (CPU) configured to:

receive, from a satellite, a captured image captured by the satellite and metadata; and add the metadata to the captured image, wherein the metadata includes:

first information regarding a person associated with the captured image, a satellite cluster identifier for identifying a satellite cluster that includes the satellite, and second information regarding imaging contents of an imaging operation by the satellite, the second information regarding the imaging contents includes a satellite position at a time of the imaging operation, the satellite position at the time of the imaging operation includes information regarding an accuracy of an attitude control by the satellite at the time of the imaging operation, and the metadata is received from the satellite as a stream different from the captured image.

14. The image processing system according to claim 13, wherein the metadata includes third information regarding an image type of the captured image.

* * * * *